United States Patent
Mathews et al.

(10) Patent No.: US 7,627,495 B2
(45) Date of Patent: Dec. 1, 2009

(54) SYSTEMS, METHODS AND COMPUTER PROGRAM PRODUCTS FOR MODELING DEMAND, SUPPLY AND ASSOCIATED PROFITABILITY OF A GOOD

(75) Inventors: Scott H. Mathews, Seattle, WA (US); Kyle M. Nakamoto, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1083 days.

(21) Appl. No.: 10/453,727

(22) Filed: Jun. 3, 2003

(65) Prior Publication Data

US 2004/0249696 A1 Dec. 9, 2004

(51) Int. Cl.
*G06F 17/60* (2006.01)
(52) U.S. Cl. ...................................................... 705/10
(58) Field of Classification Search ........................ None
See application file for complete search history.

(56) References Cited

U.S. PATENT DOCUMENTS

| | | | |
|---|---|---|---|
| 5,377,095 A * | 12/1994 | Maeda et al. | 705/10 |
| 5,692,233 A | 11/1997 | Garman | |
| 5,710,578 A | 1/1998 | Beauregard et al. | |
| 5,960,407 A | 9/1999 | Vivona | |
| 6,061,662 A | 5/2000 | Makivic | |
| 6,078,893 A * | 6/2000 | Ouimet et al. | 705/10 |
| 6,078,901 A | 6/2000 | Ching | |
| 6,157,918 A | 12/2000 | Shepherd | |
| 6,205,431 B1 * | 3/2001 | Willemain et al. | 705/10 |
| 6,321,205 B1 | 11/2001 | Eder | |
| 6,321,212 B1 | 11/2001 | Lange | |
| 6,381,586 B1 | 4/2002 | Glasserman et al. | |

(Continued)

FOREIGN PATENT DOCUMENTS

| | | |
|---|---|---|
| EP | 1 178 416 A1 | 2/2002 |
| JP | 2001357189 A * | 12/2001 |

OTHER PUBLICATIONS

Kamath, Rajashree K. and Pakkala, T.P.M. (2002) A Bayesian approach to a dynamic inventory model under an unknown demand distribution. Computers & Operations Research, v. 29, pp. 403-422.*

(Continued)

*Primary Examiner*—Ramesh B Patel
*Assistant Examiner*—Dave Robertson
(74) *Attorney, Agent, or Firm*—Alston & Bird LLP

(57) ABSTRACT

Systems, methods and computer program products for modeling demand, supply and associated profitability of a good. According to one method, a price sensitivity distribution is determined, and then a market potential distribution of a number of units of the good is determined. Next, a forecasted market is selected according to a Monte Carlo method based upon the market potential distribution, where the forecasted market includes a predefined number of units of the good. A demand and/or supply for the good in the forecasted market is then modeled based upon the price sensitivity distribution and the predefined number of units in the forecasted market. By so modeling demand and/or supply, the method can account for uncertainty in a market for the good, as defined by the number of units of the good purchased and the price at which those units are purchased and/or produced.

84 Claims, 11 Drawing Sheets

U.S. PATENT DOCUMENTS

| | | | |
|---|---|---|---|
| 6,393,406 B1 | 5/2002 | Eder | |
| 6,629,082 B1 | 9/2003 | Hambrecht et al. | |
| 6,810,332 B2 | 10/2004 | Harrison | |
| 6,853,952 B2 | 2/2005 | Chadwick | |
| 6,862,579 B2 | 3/2005 | Mathews et al. | |
| 6,910,017 B1* | 6/2005 | Woo et al. | 705/10 |
| 6,963,854 B1* | 11/2005 | Boyd et al. | 705/37 |
| 7,085,734 B2* | 8/2006 | Grant et al. | 705/20 |
| 7,110,956 B1 | 9/2006 | Drake et al. | |
| 7,133,848 B2* | 11/2006 | Phillips et al. | 705/400 |
| 7,197,474 B1* | 3/2007 | Kitts | 705/10 |
| 7,315,842 B1* | 1/2008 | Wang | 705/38 |
| 7,349,878 B1* | 3/2008 | Makivic | 705/37 |
| 7,398,221 B1 | 7/2008 | Bensoussan et al. | |
| 2001/0041996 A1 | 11/2001 | Eder | |
| 2002/0010667 A1 | 1/2002 | Kant et al. | |
| 2002/0116348 A1 | 8/2002 | Phillips et al. | |
| 2002/0143604 A1 | 10/2002 | Cox et al. | |
| 2003/0014337 A1 | 1/2003 | Mathews et al. | |
| 2003/0033191 A1 | 2/2003 | Davies et al. | |
| 2003/0078870 A1 | 4/2003 | Datar et al. | |
| 2003/0115128 A1 | 6/2003 | Lange et al. | |
| 2003/0144897 A1 | 7/2003 | Burruss et al. | |
| 2004/0068455 A1 | 4/2004 | Jacobus et al. | |
| 2004/0098327 A1 | 5/2004 | Seaman | |
| 2004/0128221 A1 | 7/2004 | Pandher | |
| 2007/0022031 A1 | 1/2007 | Sponholtz et al. | |
| 2007/0050282 A1 | 3/2007 | Chen et al. | |
| 2008/0208678 A1* | 8/2008 | Walser et al. | 705/10 |

OTHER PUBLICATIONS

Hirschleifer (1980) Price Theory and Applications. Prentice-Hall: New York. pp. 126-151 (31 pages total).*

Morris (1992) Market Oriented Pricing. Quarom Books: New York, pp. 172-173 (7 pages total).*

Evans and Berman (1992). Marketing, Macmillan: New York. Chapter 18: Overview of Price Planning, pp. 526-547 (25 pages total).*

Berry, Steven and Levinsohn, James and Pakes, Ariel. Automobile Prices in Market Equilibria. Econometrica, vol. 63, No. 4 (Jul. 1995), pp. 841-890.*

Monroe, Kent b. (1978). Models for Pricing Decisions. Journal of Marketing Research, vol. XV (August), pp. 413-428.*

Urban, Glen L. and Lipstein, Benjamin. (1968) A New Product Analysis and Decision Model. Management Science, vol. 14, No. 8 (April), pp. B490-B519.*

Yang, Sha and Chen, Yuxin and Allenby, Greg M. (2003) Bayesian Analysis of Simultaneous Demand and Supply. Quantitative Marketing and Economics, vol. 1, pp. 251-275.*

Eric L. Burgess, Hany S. Gobrieal; *Integrating Spacecraft Design and Cost-Risk Analysis Using NASA Technology Readiness Levels*; Feb. 1996; 29th Annual DoD Cost Analysis Symposium, Leesburg, Virginia; 14 pages; The Aerospace Corporation; Herndon, Virginia.

Ray Nelson; Risk Analysis Using @RISK® and Crystal Ball®; *Oracle of IIE*; Dec. 2000; pp. 8-11.

John M. Charnes; Using Simulation for Option Pricing; Dec. 2000; pp. 151-157; *Proceedings of the 2000 Winter Simulation Conference*, Orlando, Florida.

*Risk Analysis Overview—What is Risk?*; Available at <http://www.decisioneering.com/risk-analysis-print.html> (visited Feb. 19, 2002).

*Real Options with Monte Carlo Simulation*; Available at <http://www.puc-rio.br/marco.ind/monte-carlo.html> (visited Feb. 25, 2002).

*Cone of Uncertainty*; Available at <http://www.real-options.com/cou.html> (visited Oct. 11, 2002).

Weston Copeland; *Managerial Finance*; 1990; pp. 481-487, 406-407, 642 (10 pages); $9^{th}$ Edition; ISBN 0 03 0558832.

Alan Shapiro; *Modern Corporate Finance*; 1990; pp. 438, 261; ISBN 002409530-3.

Felstead, "A Mathematical Approach to Cost Minimization of Satcom Systems", 1996, IEEE, pp. 352-356.

Morrison, "Life Cycle Approach to New Product Forecasting", Summer 1995, *The Journal of Business Forecasting Methods & Systems*, 14, 2, ABI/INFORM Global, p. 3.

Eskin, "Dynamic Forecast of New Product Demand Using a Depth of Repeat Model", May 1973, *JMR Journal of Marketing Research*, 10, 0000002, AB/INFORM Global, p. 115.

Bassin, "The Logistic Curve—another approach to new product forecasting", Fall 1991, *The Journal of Business Forecasting Methods & Systems*, 10, 3, ABI/INFORM Global, p. 14.

Paszko et al., "Product Life Cycles and Profitability", Summer 1989, *The Journal of Business Forecasting Methods & Systems*, 8, 2; ABI/INFORM Global, p. 26.

Nelson, "The Product Life Cycle of Engineered Metals: a comparative analysis of the application of product life cycle theory", Spring 1992, *The Journal of Business & Industrial Marketing*, 7, 2, ABI/INFORM Global, p. 5.

Curry, "FALCCM-H: Functional Avionics Life Cycle Cost Model for Hardware", © 1993, IEEE, pp. 950-953.

Xie et al., "Probabilistic Design Optimization of Aircraft Structures with Reliability, Manufacturability, and Cost Constraints", Apr. 7-10, 2003, $44^{th}$ AIAA/ASME/ASCE/AHS Structures, Structural Dynamics, and Materials Conference, Norfolk, VA, p. 1.

Marx et al., "Knowledge-based manufacturing and structural design for a high speed civil transport", 1994, $1^{st}$ Industry / Academy Symposium on Research for Future Supersonic and Hypersonic Vehicles, Greensboro, NC pp. 1-6.

Schrage, "Technology for Rotorcraft Affordability Through Integrated Product/Process Development (IPPD)", 1999, American Helicopter Society $55^{th}$ Annual Forum, Montreal, Canada, pp. 1-19.

Largent, "A probabilistic risk management based process for planning and management of technology development", PhD Dissertation Georgia Tech Aerospace Engineering, Mar. 2003, downloaded 9/3/208 [retrieved from http://smartech.gatech.edu/handle/1853/12168], pp. 1-79, 210-271.

Breeden et al., "Prices of State Contingent Claims Implicit in Options Prices", *Journal of Business*, vol. 51, No. 4, pp. 621-651 (Oct. 1978).

Cortazar et al., "Monte Carlo Evaluation Model of an Undeveloped Oil Field", *Journal of Energy Finance & Development*, vol. 3, No. 1, pp. 73-84. Available online Jan. 13, 1998. ISSN: 1085-743.

Charnes, John M., "Using Simulation for Option Pricing", The University of Kansas School of Business, Dec. 13, 2000, Presented at 2000 Winter Simulation Conference, Dec. 10-13, 2000, Wyndham Palace Resort and Spa, Orlando, FL, www.wintersim.org, pp. 151-157.

MacMillan, Fional, "Risk, Uncertainty and Investment Decision-Making in the Upstream Oil and Gas Industry", MA Hons (University of Aberdeen), Oct. 2000, A thesis presented for the degree of Ph.D. at the University of Aberdeen.

Longstaff, et al., "Valuing American Options by Simulation: A Simple Least-Squares Approach", Anderson Graduate School of Management, eScholarship Repository, University of California, http://repositories.cdlib.org/anderson/fin/1-01, 2001.

International Search Report dated Nov. 19, 2008 for International Application No. PCT/USO4/17258.

* cited by examiner

✻ MAXIMUM PROFITS

SYSTEMS, METHODS AND COMPUTER PROGRAM PRODUCTS FOR MODELING DEMAND, SUPPLY AND ASSOCIATED PROFITABILITY OF A GOOD

FIELD OF THE INVENTION

The present invention relates generally to modeling demand of a good and, more particularly, to systems, methods and computer program products for modeling demand, supply and associated profitability of a good based on variable market size models, prices paid by consumers and costs.

BACKGROUND OF THE INVENTION

In classical economics, supply and demand have traditionally been examined by economists to explain how markets generate the price and quantity of a traded good. Generally, markets are seen to generate the price and quantity of a traded good by correlating the amount of a given good that manufacturers anticipate selling at a given price (i.e., supply) with the amount of that good that consumers are willing to purchase (i.e., demand). Supply refers to the varying amounts of a certain good that manufactures will supply at different prices. Because, in general, a higher price yields a greater supply, supply is often illustrated by an upward-sloping curve on a graph of price versus quantity during a specified time period. Demand, on the other hand, refers to the quantity of a good that is demanded by consumers at any given price. In this regard, because demand generally decreases as price increases, demand is often illustrated by a downward-sloping curve on a graph of price versus quantity for a specified time period.

To manufacturers, supply and demand curves can be useful tools that can aid in modeling the profitability of a given good. Conventionally, demand curves that are used by manufacturers are based on historical data and estimates. But because adequate historical data and estimates are often lacking in a large number of industries, demand curves are rarely used to model profitability for given goods. Also aiding in the lack of use, demand curves often inadequately integrate variable factors such as market size and prices paid by consumers for given goods. Further, demand curves generally do not account for the impact of variability in the relationship of prices to the number of a given good sold.

SUMMARY OF THE INVENTION

In light of the foregoing background, the present invention provides systems, methods and computer program products for modeling demand, supply and associated profitability of a good. The systems, methods and computer program products of the present invention advantageously are capable of modeling the demand, supply and associated profitability based on sparse historical data or estimates regarding present and future price and quantity of the good. Also, the present invention is capable of modeling the demand, supply and, thus the profitability as a function of the size of the market within which the good is sold more adequately than conventional methods of modeling the demand. Additionally, the systems, methods and computer program products model the demand, supply and associated profitability while better accounting for variability in the relationship of the price of the good and the number of units of the good purchased.

By accounting for variability in the relationship of the price of the good and the number of units of the good purchased, embodiments of the present invention are capable of modeling demand, supply and associated profitability while accounting for uncertainty in the price of the good and the number of units of the good purchased. Such modeling is advantageous in a number of different contexts, such as in the context of commercial transactions. In this regard, programs for the future sale of goods inherently have associated uncertainty, particularly as it relates to the market for the goods, typically defined by the number of good purchased and the price at which each unit of the good is purchased. According to embodiments of the present invention, then, demand, supply and associated profitability of a good can be modeled in a manner that facilitates deriving an understanding about a future market that is uncertain, particularly when data regarding price and number of units of the good purchased are sparse.

According to one aspect of the present invention, a method is provided that includes modeling demand and/or for a good based upon a price sensitivity distribution of a unit purchase of the good and a market potential distribution of a number of units of the good in a market. According to the method, the price sensitivity distribution of a unit purchase of the good can be determined. For example, when modeling demand, the price sensitivity distribution can be determined by determining a price sensitivity distribution of a unit purchase at a predetermined price, and thereafter recasting the price sensitivity distribution in a reverse cumulative format. Similarly, for example, when modeling supply, the price sensitivity distribution can be determined by determining a price sensitivity distribution of a unit purchase at a predetermined price, and thereafter recasting the price sensitivity distribution in a cumulative format. In this regard, the price sensitivity distribution can comprise a lognormal price sensitivity distribution and can be determined based upon a mean price at which the unit is purchased and an associated standard deviation. The market potential distribution can similarly comprise a lognormal market potential distribution and can be determined based upon a mean number of units at which the good is demanded and/or supplied in the market and an associated standard deviation. Both price sensitivity and market potential can be represented by distributions other than lognormal distributions in order to best represent economic market realities or data limitations. By representing the price sensitivity and the market potential as lognormal distributions, the price sensitivity and market potential distributions may more accurately represents how changing the price of the good changes whether consumers will purchase the good, and whether manufacturers will produce the good.

Before modeling demand and/or supply, a market can be forecasted by randomly selecting a predefined number of units of the good based upon the market potential distribution, such as according to a Monte Carlo method. By selecting the forecasted market according to the Monte Carlo method, the method is capable of modeling demand and/or supply, and thus the profitability, as a function of the size of the market within which the good is sold more reliably than conventional methods of modeling demand or supply. And after selecting the forecasted market, a market penetration distribution can be determined based upon different numbers of units of the good that represent corresponding percentages of the predefined number of units in the forecasted market.

After selecting the forecasted market, or after determining the market penetration distribution, demand and/or supply for the good in the forecasted market can be modeled based upon the distribution of a unit purchase and the predefined number of units in the forecasted market. For example, demand and/or supply can be modeled by determining a relationship between a plurality of prices per unit and different numbers of units of the good that represent corresponding percentages of the predefined number of units in the forecasted market. In embodiments including the market penetration distribution, demand and/or supply can be modeled based upon the price sensitivity distribution and the market penetration distribution. In another embodiment, different forecasted markets are repeatedly selected, with each forecasted market including a predetermined number of units of the good. In this embodiment, demand and/or can be modeled for each forecasted market selected.

According to another aspect of the present invention particularly suited for modeling demand, supply and/or associated profitability for a good in a differentiated market, the method further includes determining at least one contract purchases collection for at least one predefined number of contracts, where each contract includes a number of units of the good at a predetermined price per unit. For example, the contract purchases collections can be determined based upon a units per contract distribution and a correlation between the distribution of a unit purchase and the units per contract distribution. In this regard, the contract purchases collections can be determined by determining the number of units included in each of a predefined number of contracts based upon a units per contract distribution, such as according to the Monte Carlo method. According to one embodiment, a number of units in each contract are determined such that the sum of the number of units included in each contract equals a percentage of the predetermined number of units in the forecasted market, where the percentage is representative of the market share. After determining the number of units in each contract, a price per unit for the units included in each of the predefined number of contracts can be determined based upon the number of units included in each contract and a correlation between the distribution of consumers purchasing a unit and the units per contract distribution.

After determining contract purchases collections, demand and/or supply for the good can be modeled based upon the contract purchases collections and the market potential distribution or, more particularly, a forecasted market selected from the market potential distribution. For example, the demand can be modeled by calculating a cumulative number of units for each different price per unit determined by summing the number of units in each contract having a price per unit no less than the respective price per unit, and thereafter modeling the demand for the good based upon each different price per unit and the respective cumulative number of units. Similarly, for example, the supply can be modeled by calculating a cumulative number of units for each different price per unit determined by summing the number of units in each contract having a price per unit no greater than the respective price per unit, and thereafter modeling the supply for the good based upon each different price per unit and the respective cumulative number of units. Alternatively, when modeling demand, the cumulative number of units can comprise the difference between the predefined number of units in the forecasted market and the sum of number of units in each contract having a price per unit no greater than the respective price per unit. Alternatively, when modeling supply, the cumulative number of units can comprise the difference between the predefined number of units in the forecasted market and the sum of number of units in each contract having a price per unit no less than the respective price per unit. As will be appreciated, by determining the contract purchases collection and modeling the demand based upon the contract purchases collections, this aspect of the present invention is particularly suited to modeling demand and/or for goods in a differentiated market where the goods are purchased according to contracts each of which may include a different number of units and/or a different price per unit.

According to an additional aspect of the present invention, the method can include modeling cost of the good along with the demand. Then, profitability of the good can be modeled based upon the cost model and the demand model. According to this aspect, the cost can be modeled by modeling an average cost per unit for the different numbers of units. Then, for example, the profitability can be modeled by subtracting the average cost per unit for the different numbers of units from the prices per unit for the respective different numbers of units. A maximum profit can be determined for a certain number of units and price correspondence. In one embodiment where different markets are repeatedly forecasted, the demand, cost and profitability can be modeled for each forecasted market.

According to yet another aspect of the present invention particularly suited for goods in differentiated markets, cost for the good in the forecasted market can be modeled based upon the predefined number of contracts and the predefined number of units in a forecasted market. For example, the cost can be modeled by modeling an average cost per unit for each cumulative number of units associated with the different prices per unit and thereafter selecting the lowest cost per unit. The profitability of the good in the forecasted market can then be modeled, for example, by subtracting the lowest cost per unit from the price per unit associated with the each cumulative number of units.

The systems, methods and computer program products of the present invention therefore are capable of facilitating an understanding about demand and/or supply for a good in an uncertain future market, where demand and/or supply can be defined based upon the number of units of a good purchased for a price per unit. Advantageously, the systems, methods and computer program products are capable of modeling the demand, supply and associated profitability based on sparse historical data or estimates regarding price and quantity of the good. Also, by incorporating the unknown size of the market in the form of the market potential distribution, and by selecting a forecasted market according to the Monte Carlo method, the present invention is capable of modeling the demand, supply and, thus the profitability, as a function of the size of the market within which the good is sold more adequately than conventional methods of modeling the demand and supply. Additionally, by including a lognormal price sensitivity distribution, the systems, methods and computer program products model demand, supply and associated profitability while better accounting for how changing the price of the good changes the number of units of the good purchased.

BRIEF DESCRIPTION OF THE DRAWINGS

Figure 1:
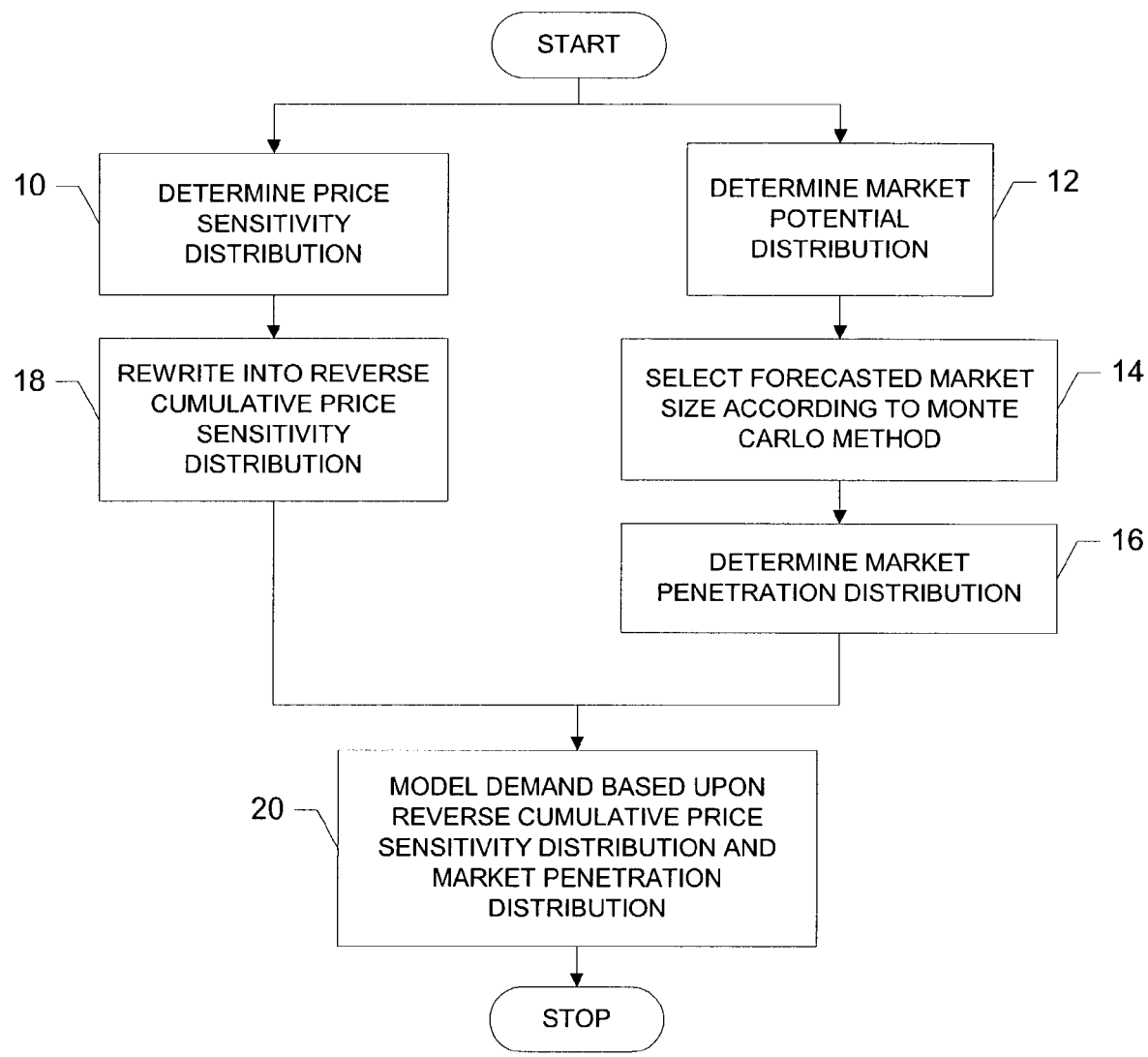
Figure 2:
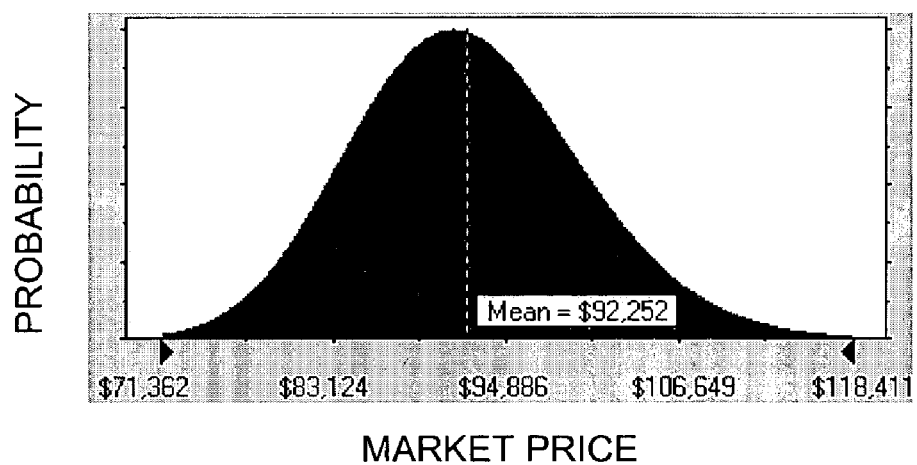
Figure 3:
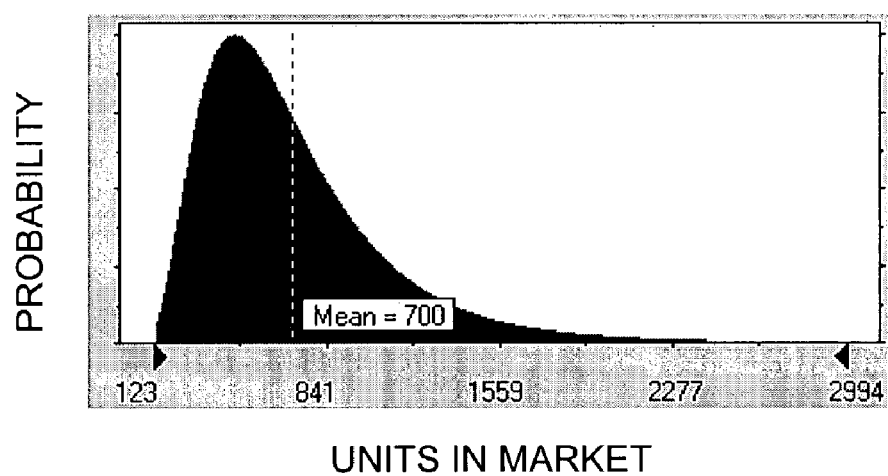
Figure 4A:
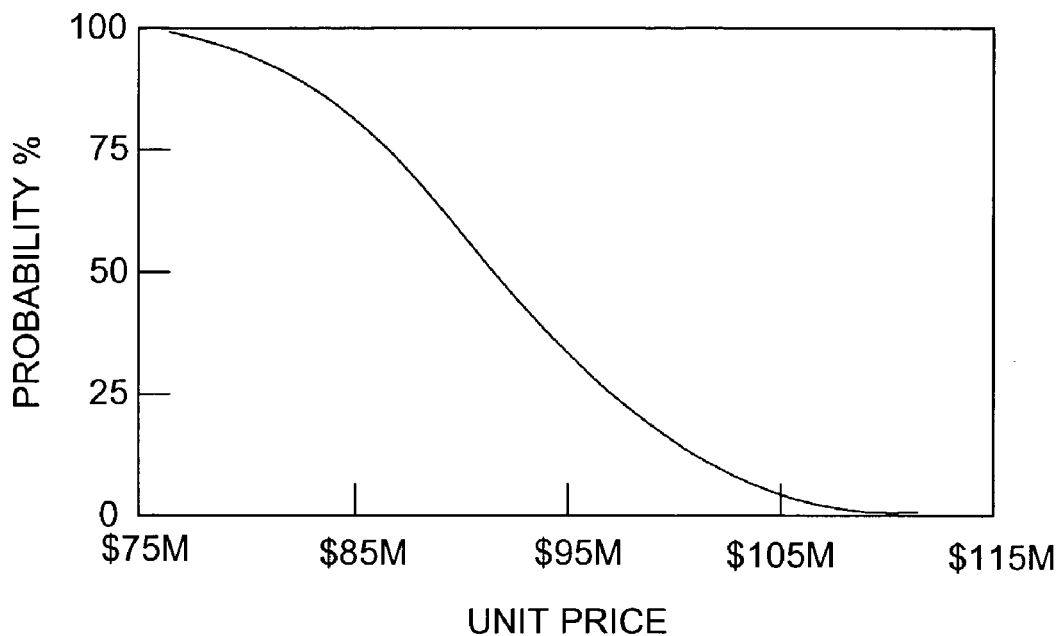
Figure 4B:
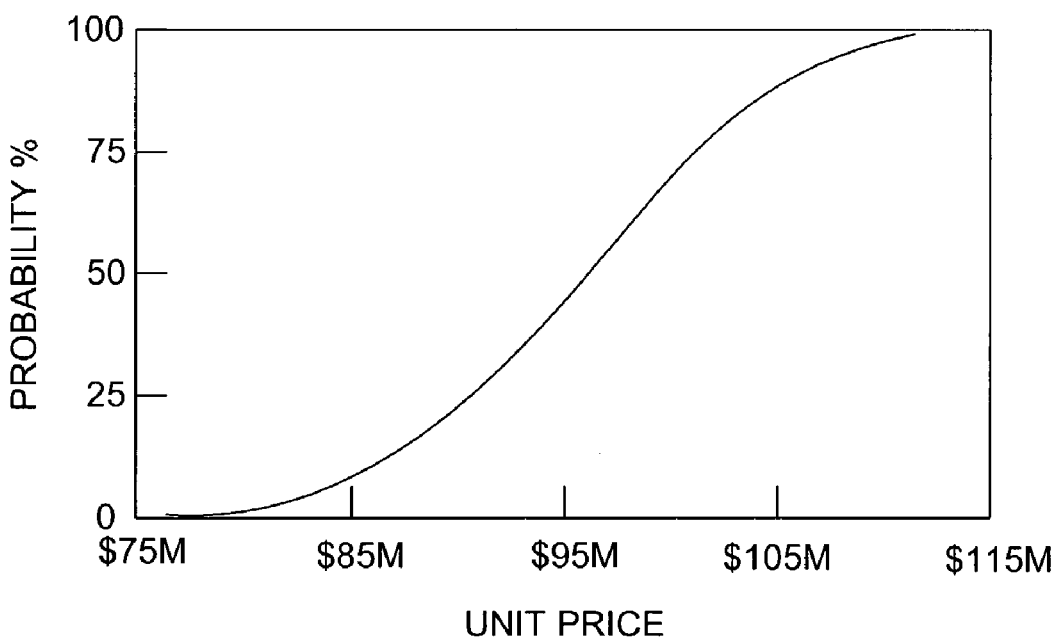
Figure 5:
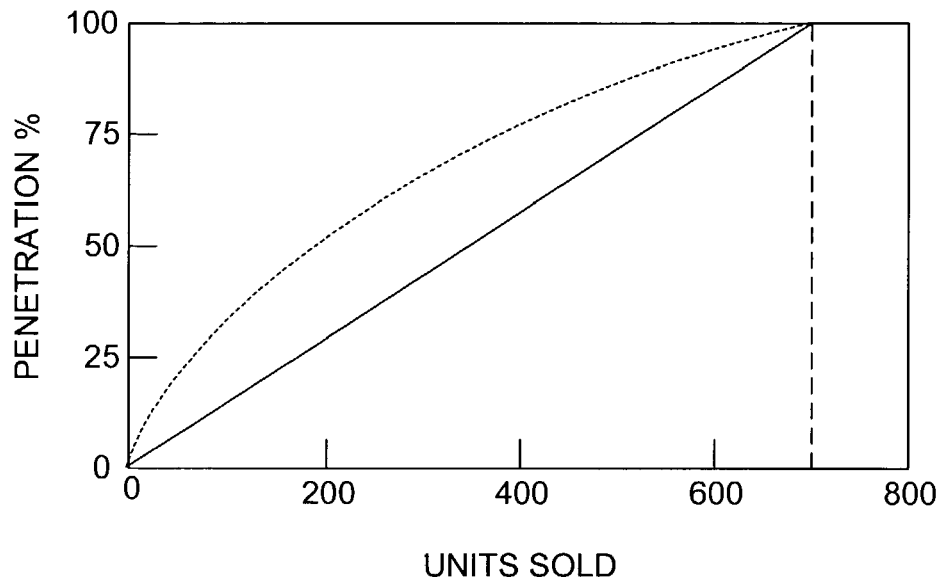
Figure 6A:
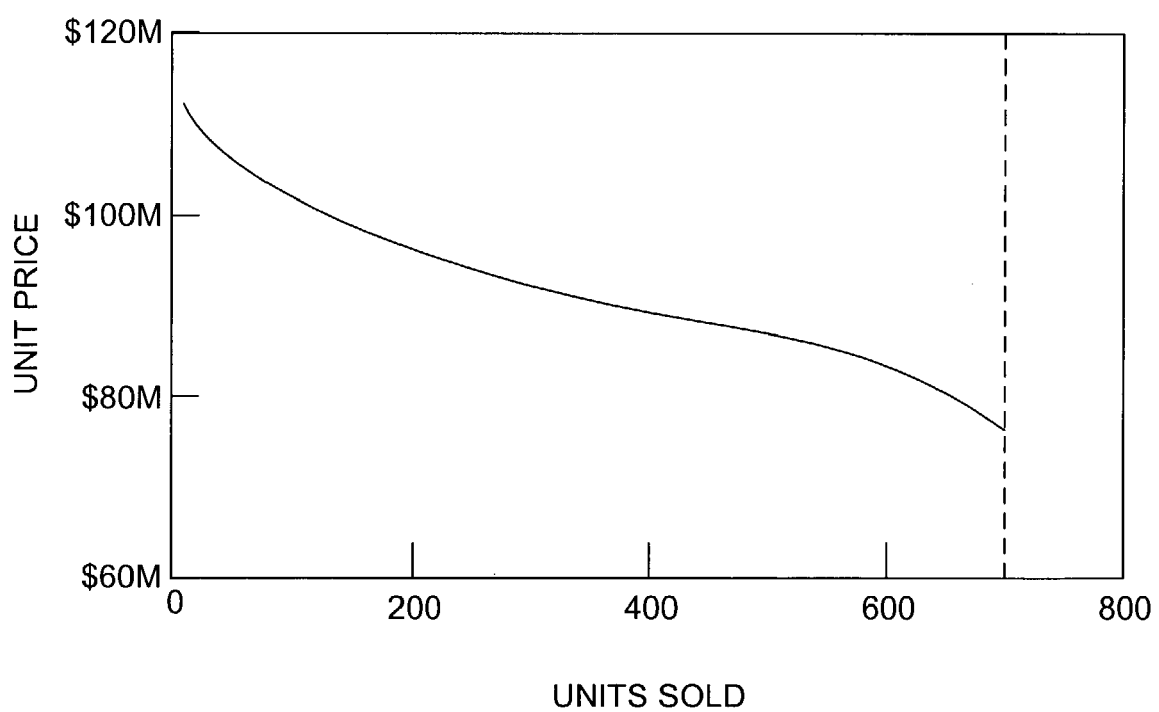
Figure 6B:
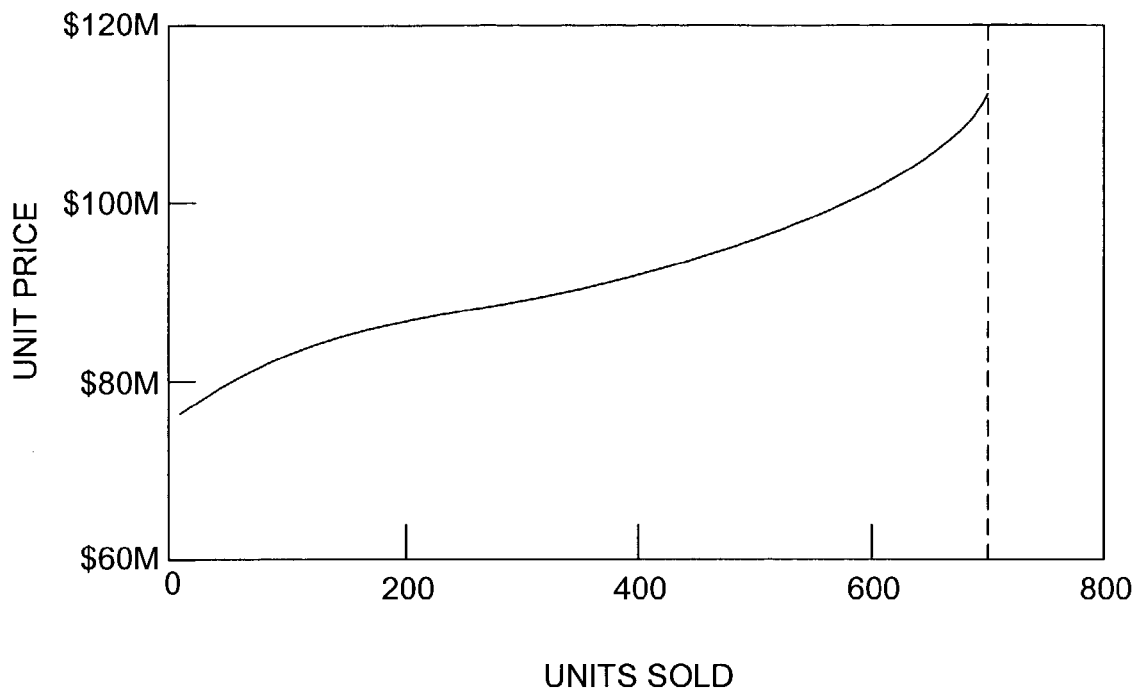
Figure 7:
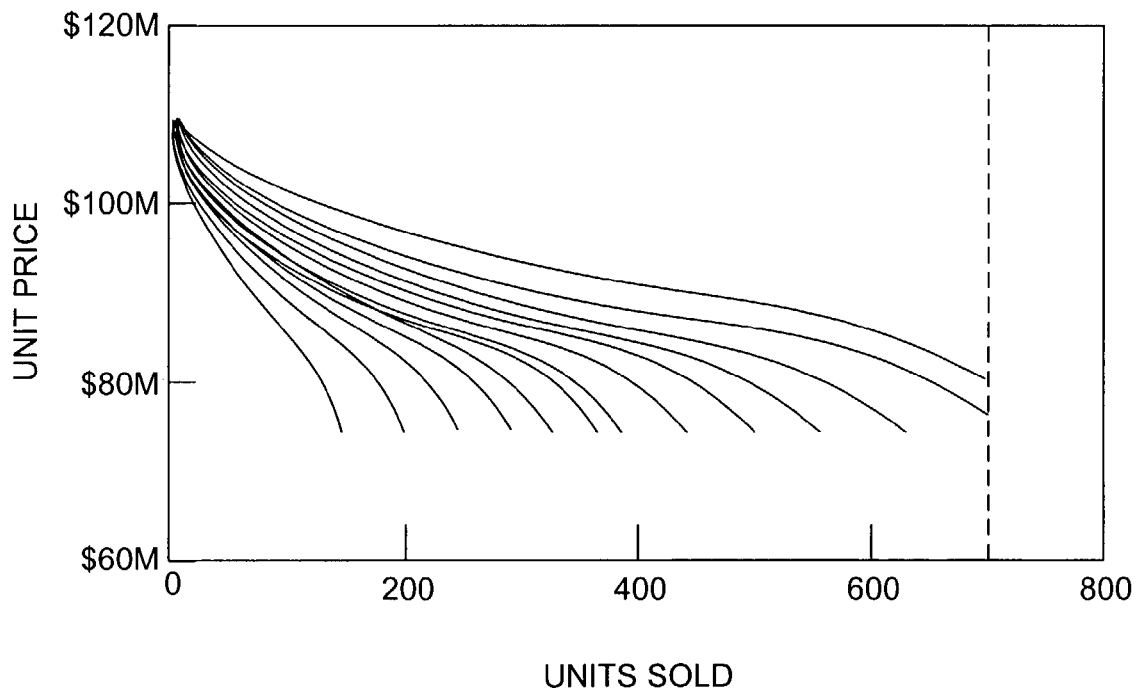
Figure 8:
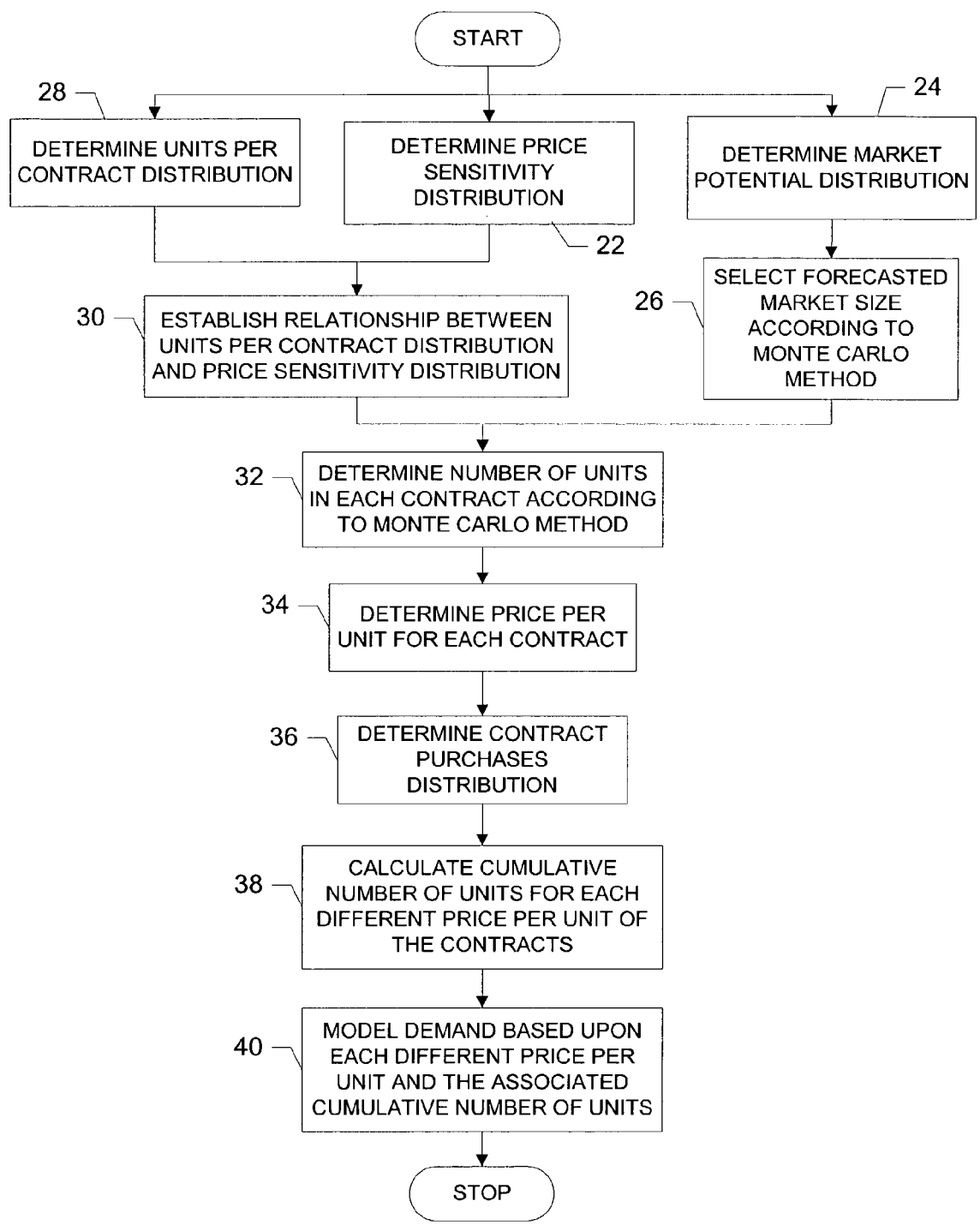
Figure 9:
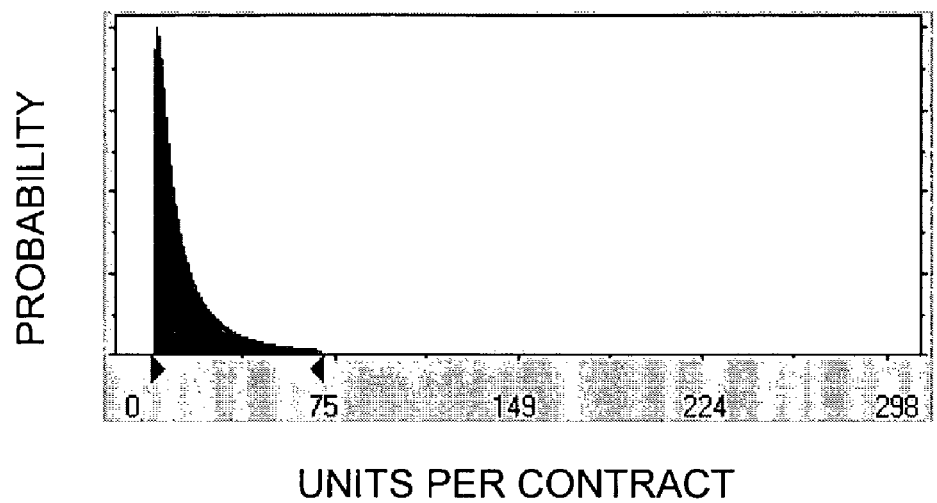
Figure 10:
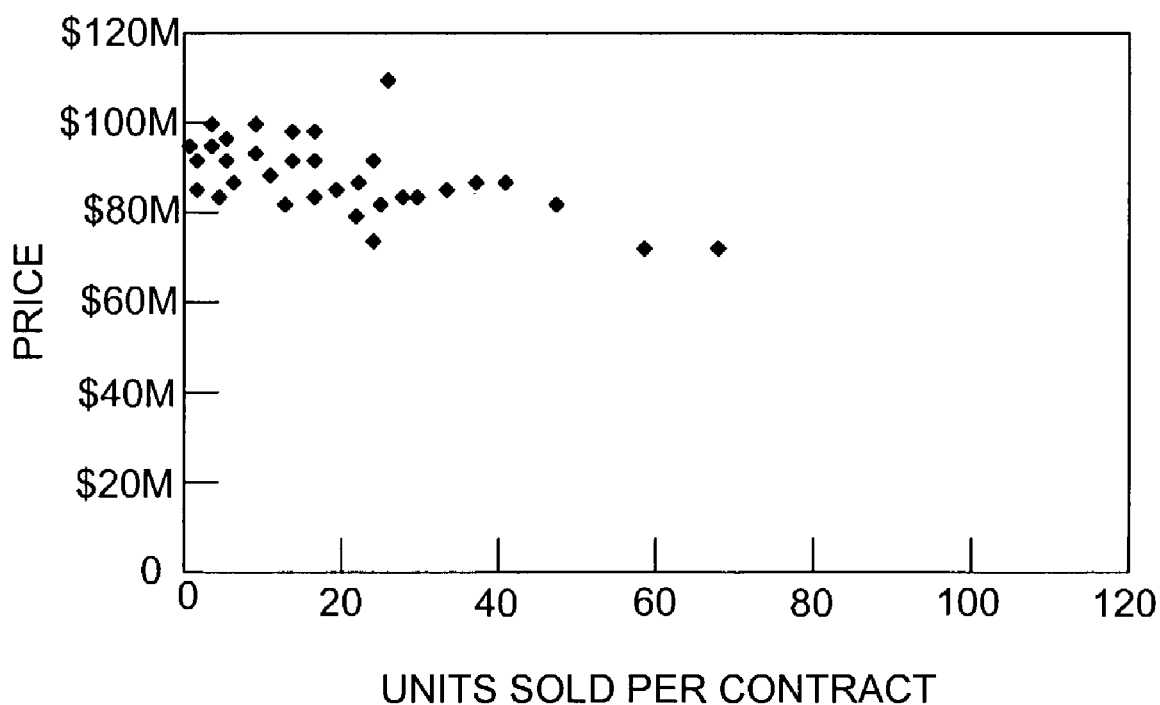
Figure 11:
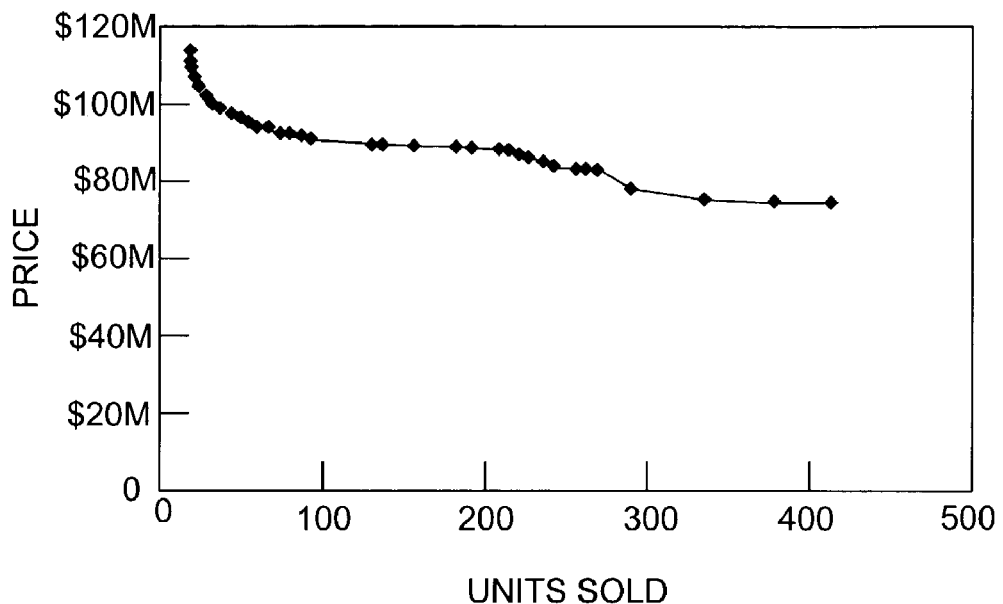
Figure 12:
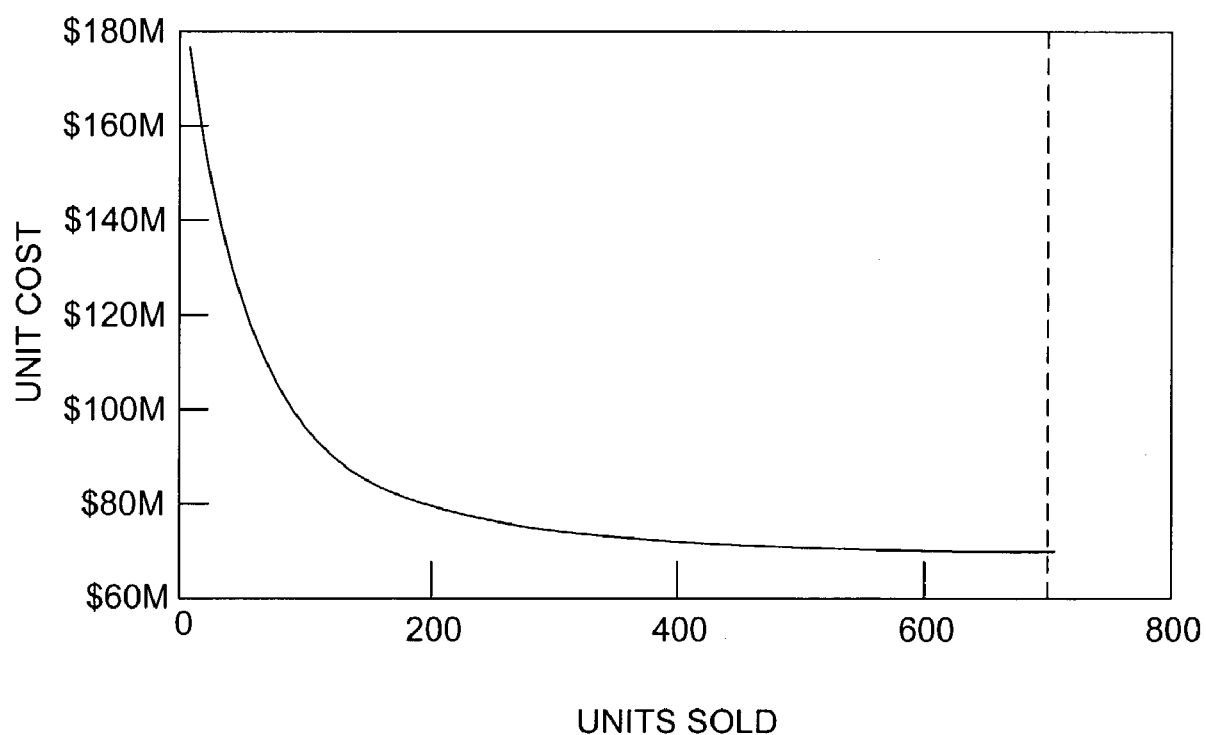
Figure 13:
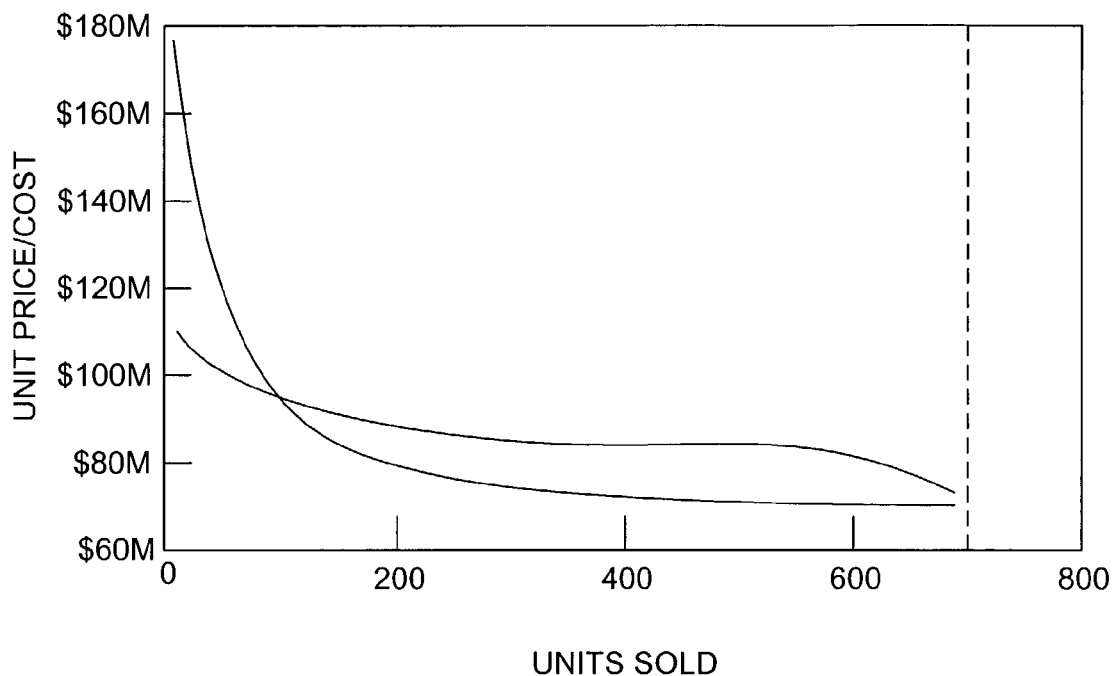
Figure 14:
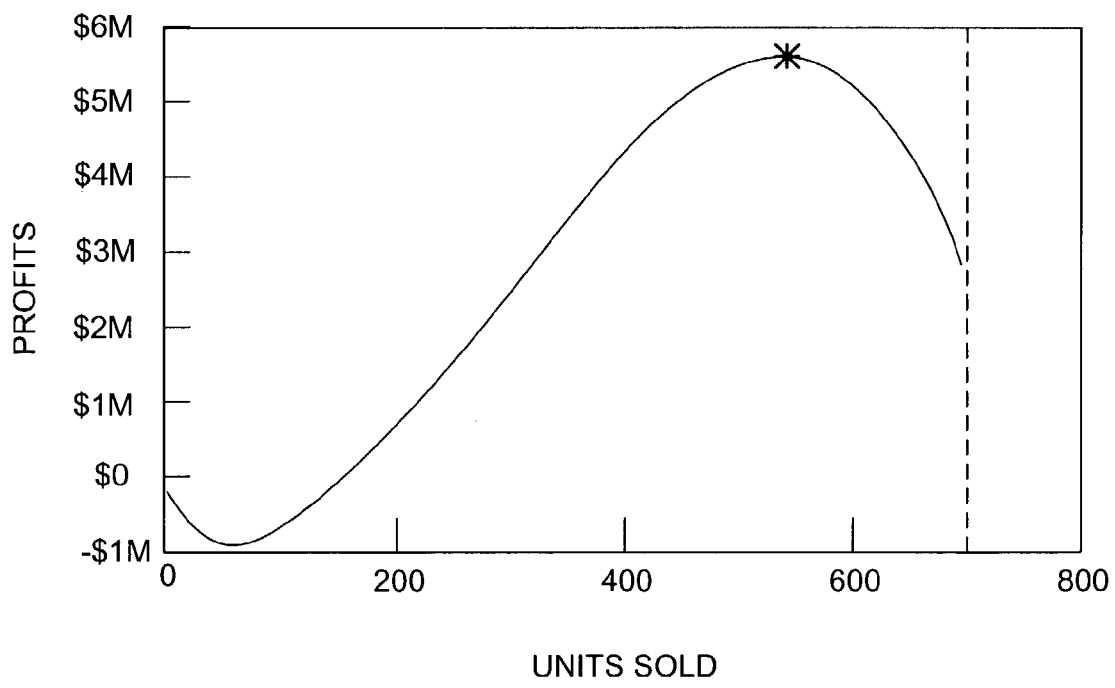
Figure 15:
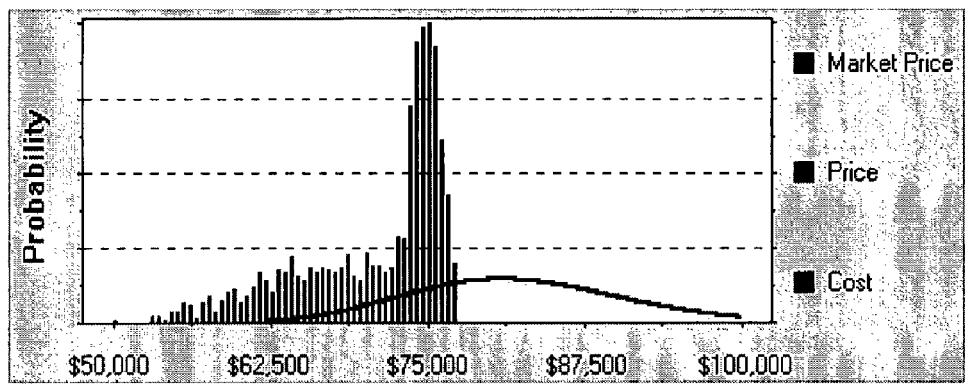
Figure 16:
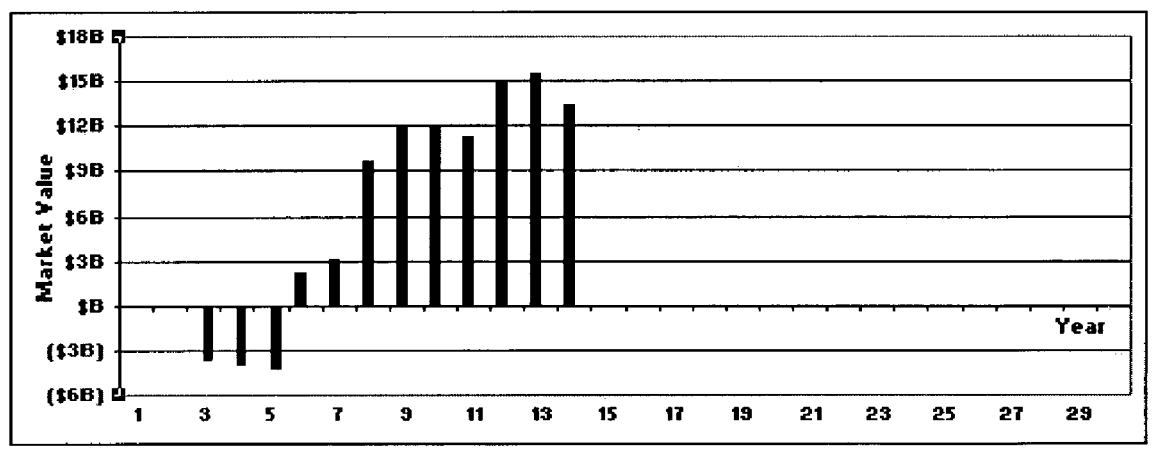
Figure 17:
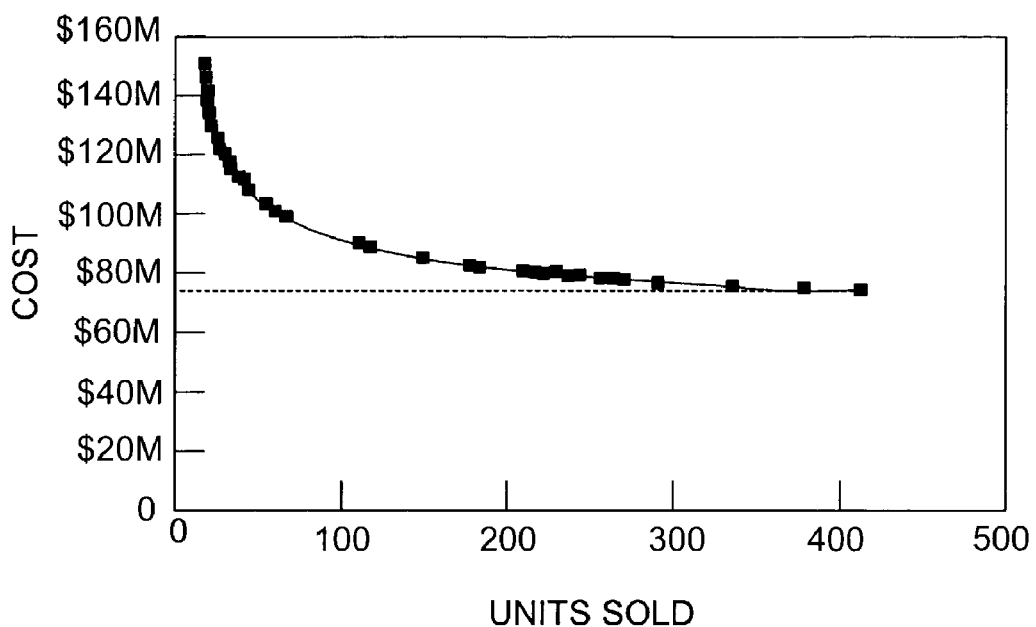
Figure 18:
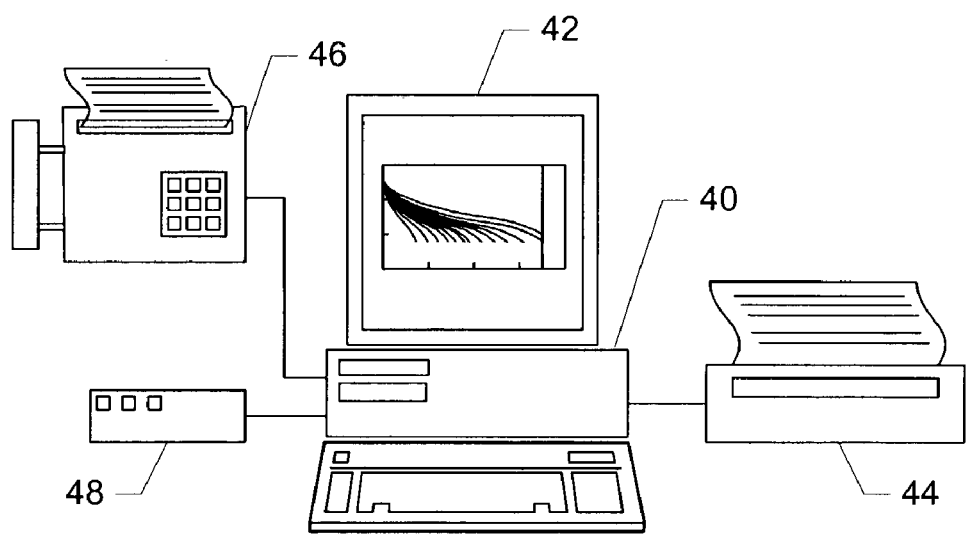

Having thus described the invention in general terms, reference will now be made to the accompanying drawings, which are not necessarily drawn to scale, and wherein:

FIG. 1 is a flowchart including various steps in a system, method and computer program product for modeling the demand for a good purchased in a non-differentiated market according to one embodiment of the present invention;

FIG. 2 is a graph of a price sensitivity distribution utilized during operation of the system, method and computer program product of one embodiment of the present invention;

FIG. 3 is a graph of a market potential distribution utilized during operation of the system, method and computer program product of one embodiment of the present invention;

FIG. 4A is a schematic illustration of a price sensitivity distribution recast in reverse cumulative format utilized during operation of the system, method and computer program product for modeling demand according to one embodiment of the present invention;

FIG. 4B is a schematic illustration of a price sensitivity distribution recast in cumulative format utilized during operation of the system, method and computer program product for modeling supply according to one embodiment of the present invention;

FIG. 5 is a schematic illustration of a market penetration distribution for a forecasted market utilized during operation of the system, method and computer program product of one embodiment of the present invention;

FIG. 6A is a schematic illustration of a demand curve for a forecasted market according to one embodiment of the present invention in the context of a good purchased in a non-differentiated market;

FIG. 6B is a schematic illustration of a supply curve for a forecasted market according to one embodiment of the present invention in the context of a good purchased in a non-differentiated market;

FIG. 7 is a schematic illustration of multiple demand curves for multiple forecasted markets according to one embodiment of the present invention in the context of a good purchased;

FIG. 8 is a flowchart including various steps in a system, method and computer program product for modeling the demand for a good purchased in a differentiated market according to one embodiment of the present invention;

FIG. 9 is a graph of a units per contract distribution utilized during operation of the system, method and computer program product of one embodiment of the present invention;

FIG. 10 is a is a graph illustrating a contract purchases collection utilized during operation of the system, method and computer program product of one embodiment of the present invention;

FIG. 11 is a schematic illustration of a demand curve for a forecasted market according to one embodiment of the present invention in the context of a good purchased in a differentiated market;

FIG. 12 is a schematic illustration of a cost curve utilized during operation of the system, method and computer program product of one aspect of the present invention in the context of a good purchased in a non-differentiated market;

FIG. 13 is a schematic illustration comparing the demand curve of FIG. 6 with the cost curve of FIG. 12;

FIG. 14 is a schematic illustration of a profitability curve according to one embodiment of the present invention;

FIG. 15 is a schematic illustration of a price sensitivity distribution plotted against a distribution of optimum price and an associated cost distribution;

FIG. 16 is a schematic illustration of the market value of a project of selling a good over time determined according to one embodiment of the present invention;

FIG. 17 is a schematic illustration of a cost curve utilized during operation of the system, method and computer program product of one embodiment of the present invention in the context of a good purchased in a differentiated market; and FIG. 18 is a schematic block diagram of the system of one embodiment of the present invention embodied by a computer.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

I. Modeling Demand and/or Supply for a Good

According to one aspect of the present invention, systems, methods and computer program products are provided for modeling demand and/or supply for a good. In the economy, products can generally be categorized in one of two markets, either a non-differentiated market or a differentiated market. In a non-differentiated market, such as a commodity market, all competing goods are offered at a single price. For example, wheat, cotton, silver and oil are all goods that are typically offered at a single price. In a differentiated market, on the other hand, the prices of competing goods can be differentiated by the perceived values in the features that characterize the respective goods. As such, in a differentiated market, the value of the distinguishing features are revealed and determined during private negotiations between a supplier and a consumer. As the negotiation results of price remain private, the process allows different amounts of goods to be sold at different prices. For example, wholesaled lots of automobiles and aircraft are both goods that, due to differing features, can be sold at differing prices for differing quantities. Another type of differentiated market is one where there are sophisticated pricing systems that exploit small differences among buyer preferences, for example airplane seat, travel and concert seat reservation systems, and department store merchandise pricing coupled with membership discounting.

In a non-differentiated market, all goods are typically sold and purchased according to a single price for each unit of the good. In a differentiated market, however, the goods can vary in price. In this regard, goods in a differentiated market are typically sold according to contracts for a predetermined number of units of the good at a predetermined price for each unit. As such, the present invention provides systems, methods and computer program products for modeling demand and/or for goods in a non-differentiated market as well as a differentiated market. The following description will explain modeling demand for goods. In this regard, it will be appreciated that, except were indicated, the following description applies equally to modeling supply for goods.

A. Goods in Non-Differentiated Markets

The demand for a good in a non-differentiated market is generally a function of the price per unit of the good and the size of the market in terms of the total number of units of the good in the market, both of which differ depending upon the good. In this regard, in modeling the demand for some subsequent time in the future, neither the price of the good nor the size of the market can be specified as each includes an amount of uncertainty. Thus, to most accurately model the demand for the good such that the uncertainty in the price per unit and/or the size of the market are captured, the demand is typically modeled based upon a distribution of the possible prices for which the good may be sold, and a distribution of the possible sizes of the market within which the good may be sold.

Referring to FIG. 1, modeling the demand for a good in a non-differentiated market generally begins by assessing uncertainty in the price per unit of the good by determining how the price of the good affects whether customers will purchase the good, or in the case of modeling supply, how the price of the good affects whether manufacturers will produce the good. In this regard, uncertainty in the purchase price of each unit of the good is typically expressed in a price sensitivity distribution of a unit purchase of the good at a predetermined price, as shown in block 10. The price sensitivity distribution generally assigns a probability of a unit purchase to each respective price at which consumers would purchase the unit. Advantageously, the price sensitivity distribution can be developed from sparse data of real or hypothetical consumer purchases of at least one unit of the good at respective prices per unit developed according to any one of a number of different methods, such from a number of historical sales or a market survey. The price sensitivity distribution can be developed with as little as two such consumer purchases, however, the number of purchases typically numbers thirty or more.

Advantageously, and particularly in instances in which data of real or hypothetical consumer purchases is sparse, uncertainty in the price of the good, or the price sensitivity distribution, can be defined based upon a state of development of technologies associated with the good. In this regard, in many industries, decisions about projects for the manufacture and sale of a good require manufacturers to estimate technical risk, or technical maturity, associated with the state of development of the project in order to correctly determine success probabilities and investment levels for the project, i.e., to determine risk and return probabilities. In this regard, development of the project can include one or more different technologies, with different technologies in different stages of development.

Whereas information regarding technical risk can be useful to manufacturers, such information is often qualitative. For example, one such group of qualitative measures of technical risk, or technical maturity, are the Technology Readiness Levels (TRL's) developed by the National Aeronautics and Space Administration (NASA). To account for the state of development of the associated technologies, each technology associated with the good is associated with a qualitative measure of maturity, where each qualitative measure of maturity is associated with a distribution. As such, each technology is associated with the distribution of the respective qualitative measure of maturity.

After associating each technology with the distribution of the respective qualitative measure of maturity, a price point, or more typically a most likely price, is selected for each technology. A price distribution can then be defined for each technology based upon the distribution associated with the respective qualitative measure of maturity and the respective most likely price. A price for each technology can be selected from the price distributions, such as according to the Monte Carlo method, and thereafter summed together to get one possible total price for the good. Next, a number of other prices for each technology can be selected and summed together in a similar manner to get a number of other possible total prices. From all of the total prices, a mean and standard deviation can be determined to thereby define the price sensitivity distribution. For more information on such a method of determining the price sensitivity distribution, see U.S. patent application Ser. No. 10/453,395, entitled: Systems, Methods and Computer Program Products for Modeling a Monetary Measure for A Good Based Upon Technology Maturity Levels, filed concurrently herewith, the contents of which are hereby incorporated by reference in its entirety.

The price sensitivity distribution can be expressed according to any of a number of different probability distribution types such as normal, triangular or uniform. But because the economy typically functions in a lognormal fashion, in a preferred embodiment the price sensitivity distribution is expressed as a lognormal probability distribution. Also, the price sensitivity distribution can be defined according to any of a number of different parameters, such as the mean and standard deviation of the historical sales. For example, the price sensitivity distribution shown in FIG. 2 is defined according to a mean of $92,252 (in thousands of dollars) with an associated standard deviation of $7,800.

In addition to factoring uncertainty in the price of the good into the demand for the good, the demand can advantageously be modeled as a function of the size of the market within which the good is purchased to thereby account for uncertainty in the size of the market. In this regard, uncertainty in the size of the market is typically represented as a market potential that refers to the total number of units of the good consumers will purchase presuming all consumer requirements are met, including price, as shown in block 12 of FIG. 1. The market potential is typically expressed as a distribution of consumers purchasing a predetermined number of units of the good. The market potential distribution generally assigns a probability to each respective number of units of the good consumers will purchase presuming all consumer requirements are met.

Advantageously, the market potential distribution can also be developed from sparse data from any one of a number of different sources, such as market studies or a myriad of other factors as known to those skilled in the art. The market potential distribution can be expressed according to any of a number of different probability distribution types such as normal, triangular or uniform but, like the market sensitivity distribution, the market potential distribution is preferably expressed as a lognormal probability distribution. Also like the market sensitivity distribution, the market potential distribution can be defined according to any of a number of different parameters, such as the mean and standard deviation of the data used to develop the market potential distribution. For example, the market potential distribution shown in FIG. 3 is defined according to a mean of 700 units with an associated standard deviation of 400 units.

As stated, the demand for the good is modeled as a function of the size of the market within which the good is sold. Thus, to model the demand for the good a forecasted market of a predefined total number of units of the good is selected from the market potential distribution. Advantageously, the number of units in the forecasted market is selected according to a method for randomly selecting a predefined number of units of the good, such as the Monte Carlo method. As known to those skilled in the art, the Monte Carlo method is a method of randomly generating values for uncertain variables to simulate a model. In this regard, the Monte Carlo method is applied to the market potential distribution to select the predefined number of units of the good in the forecasted market, as shown in block 14 of FIG. 1. And as described below, by repeatedly selecting different forecasted markets, a corresponding demand for the good can be modeled for each forecasted future market to thereby facilitate an understanding of how different market sizes affect demand for the good.

As manufacturers will typically not be capable of capturing all (i.e., 100%) of the market for a good, demand for the good can be modeled to account for different percentages of the market that a manufacturer may capture. Therefore, from the forecasted market selected, a market penetration distribution can be determined based upon different numbers of units that represent corresponding percentages of the forecasted market, as shown in block 16. For example, as shown in FIG. 5, in a market size of 700 units of the good, a sale of 350 units would be associated with a market penetration of 50%. In an alternative market penetration distribution, represented as a dotted line in FIG. 5, in a market size of 700 units of the good, a sale of 200 units would be associated with a market penetration of 50%. Once the market penetration distribution has been determined, the demand can be modeled based upon the price sensitivity distribution and the market penetration distribution. When modeling demand, to combine the price sensitivity distribution and the market penetration distribution, the price sensitivity distribution is typically first recast in reverse cumulative format, as shown in FIG. 4A. (See FIG. 1, block 18). As will be apparent, a reverse cumulative distribution depicts the number, proportion or percentage of values greater than or equal to a given value. In this regard, the reverse cumulative of the price sensitivity distribution represents the distribution of a unit purchase of the good for at least a predetermined price, i.e., at or above a predetermined price.

Similarly, when modeling supply, to combine the price sensitivity distribution and the market penetration distribution, the price sensitivity distribution is typically first recast in cumulative format, as shown in FIG. 4B. As will be apparent, a cumulative distribution depicts the number, proportion or percentage of values less than or equal to a given value. In this regard, the cumulative of the price sensitivity distribution represents the distribution of a unit manufactured when the market price for the good is at least a predetermined price, i.e., at or above a predetermined price.

Once the price sensitivity distribution has been recast, the demand for the product for the forecasted market can be modeled based upon the reverse cumulative of the price sensitivity distribution and the market penetration distribution, as shown in block 20 of FIG. 1. In this regard, for the forecasted market, the demand represents the number of units consumers will purchase for at least a given price, i.e., at or above a given price. To model the demand, each probability percent of the reverse cumulative of the price sensitivity distribution is associated with a corresponding percentage of the forecasted market from the market penetration distribution. Thus, each of a plurality of different numbers of units of the good from the market penetration distribution are linked to a minimum price per unit from the reverse cumulative price sensitivity distribution having a probability percent equal to the market penetration percent for the respective number of units. As such, the demand model can be thought of as a plurality of different numbers of units sold in the forecasted market, each number of units having a corresponding minimum price at which consumers will purchase the respective number of units. For example, a number of goods totaling 700 and having a market penetration of 100% is linked to a price per unit of approximately $77 million dollars having a probability percent of 100%. Thus, according to the demand model, 700 units of the good will be sold for at least $77 million dollars. The demand model can be represented in any one of a number of manners but, in one embodiment, the demand model is represented as a demand curve by plotting different numbers of units sold in the forecasted market versus the minimum price consumers will pay per unit for the good, as shown in FIG. 6.

Similar to modeling demand, the supply for the product for the forecasted market can be modeled based upon the cumulative of the price sensitivity distribution and the market penetration distribution. For the forecasted market, then, the supply represents the number of units manufacturers will produce when the market price for the good is at least a given price, i.e., at or above a given price. To model the supply, each probability percent of the cumulative of the price sensitivity distribution is associated with a corresponding percentage of the forecasted market from the market penetration distribution. Thus, each of a plurality of different numbers of units of the good from the market penetration distribution are linked to a maximum price per unit from the cumulative price sensitivity distribution having a probability percent equal to the market penetration percent for the respective number of units. As such, the supply model can be thought of as a plurality of different numbers of units produced in the forecasted market, each number of units having a corresponding maximum market price. Like the demand model, the supply model can be represented in any one of a number of manners. In one embodiment, for example, the supply model is represented as a supply curve by plotting different numbers of units produced in the forecasted market versus the maximum market price of the good, as shown in FIG. 6B.

As indicated above, the demand for the good is based upon the reverse cumulative of the price sensitivity distribution and the market penetration distribution, and the supply for the good is based upon the cumulative of the price sensitivity distribution and the market distribution. In this regard, it will be appreciated that the steps in determining the reverse cumulative (or cumulative) of the price sensitivity distribution and the market penetration distribution can be accomplished in any order relative to one another without departing from the spirit and scope of the present invention. For example, the price sensitivity distribution can be rewritten in reverse cumulative format before any or all of the steps in determining the market penetration distribution from the market potential distribution.

It will also be appreciated that for different numbers of units in the forecasted market, selected according to the Monte Carlo method, different market penetration distributions and, therefore, different demand models, will be determined as shown in FIG. 7. Thus, the demand model can account for the uncertainty in the size of the market affecting the demand for the good. In this regard, by repeatedly selecting different forecasted markets and repeating the method, the demand for the good in each forecasted market can be modeled stochastically. As described below, modeling the demand for the good can be utilized with a cost model to model profitability for the good in the forecasted market which, in turn, can be used to determine conclusions regarding the forecasted market, such as the optimum price per unit and the number of units sold. And by repeating the method for different forecasted markets, the profitability can be modeled for each forecasted market, and the conclusions can be determined for each forecasted market. The conclusions for the forecasted markets can then be used, such as by the manufacturer, to facilitate an understanding of how uncertainty in the price of the good and number of units in the market affect demand for the good. With such an understanding, the manufacturer can be in a better position to select a price at which to sell each unit of the good, as well as a number of units of the good to produce.

B. Goods in Differentiated Markets

Just as in the case of non-differentiated markets, to most accurately model the demand and/or supply for the good in an uncertain market, the demand is preferably modeled based upon a distribution of the possible prices for which the good may be sold, and a distribution of the possible sizes of the market within which the good may be sold and/or produced. Goods in differentiated markets differ from those in non-differentiated markets, however, in that the prices per unit of the goods are not uniform across the market. In this regard, prices per unit of the goods can be uniform within each of the plurality of contracts that include the units of the good that make up the market. Additionally, or alternatively prices per unit of the goods can be uniform within a given number of goods of the contract, such as a contract that includes 1-100- units of the good for $75 M, 101-200 units for $70 M, 201- 300 units for $65 M, etc. Thus, to most accurately model the demand for a good purchased in a differentiated market, consideration is advantageously given to the number of units of the good in each contract. And because the number of units in each contract can vary, the number of units per contract is preferably utilized in conjunction with the other distributions.

Referring now to FIG. 8, modeling the demand for a good in a differentiated market generally begins the same as modeling the demand in a non-differentiated market, that is by assessing uncertainty in the price per unit of the good by determining how the price of the good affects whether customers will purchase the good. Similarly, modeling supply in a non-differentiated market generally begins by determining how the price of the good affects whether manufacturers will produce the good. The price sensitivity of the good is typically expressed as before with the price sensitivity distribution, as shown in block 22 and FIG. 2. The market potential can likewise be expressed as before by a market potential distribution of consumers purchasing a predetermined number of units of the good, as shown in block 24 of FIG. 8 and FIG. 3. Also, as before, the demand is modeled as a function of the size of the market within which the goods are sold to thereby account for uncertainty in the size of the market. Thus, to model the demand for the product based on a forecasted market, the predefined number of units of the good in the forecasted market is selected from the market potential distribution according to the Monte Carlo method, as shown in block 26. Just as in the case of non-differentiated markets, and as described below, by repeatedly selecting different forecasted markets, a corresponding demand for the good purchased in a differentiated market can be modeled for each forecasted market.

As previously stated, non-differentiated markets differ from differentiated markets in that goods in non-differentiated markets are all sold and purchased for a uniform price, as opposed to differing prices based on individual units. In a differentiated market, the goods are sold according to contracts that each specify a predetermined number of units of the good at a predetermined price for each unit. Thus, not only does the price of the good change with the size of the market, but the price changes with each contract within the size of the market. As such, for differentiated markets, modeling the demand for the good further includes assessing the uncertainty in the number of contracts in the market, as well as uncertainty in the predetermined number of units of the good in each contract and the predetermined price per unit at which each unit in each contract is purchased. In this regard, uncertainty in the number of units in each contract can be assessed by determining a units per contract distribution, shown in FIG. 9 and in block 28 of FIG. 8.

Like the price sensitivity and market potential distributions, the units per contract distribution is typically expressed as a distribution of units of the good included in each contract. The units per contract distribution generally assigns a probability to each respective number of units that may be included in a particular contract. As with the price sensitivity and market potential distributions, the units per contract distribution can be developed from sparse historical data, such as a number of historical contracts including a number of units of the good. The units per contract distribution can be developed with as little as two historical contracts, however, the number of historical contracts typically numbers thirty or more.

The units per contract distribution can be expressed according to any of a number of different probability distribution types such as normal, triangular or uniform but, as before, in a preferred embodiment the units per contract distribution is expressed as a lognormal probability distribution. Also, the units per contract distribution can be defined according to any of a number of different parameters, such as the 10% and 90% values, as such are known. Further, the units per contract distribution can include a maximum value that sets the upper bound of the distribution. For example, the price sensitivity distribution shown in FIG. 9 is defined according to a 10% value of 2 units per contract, a 90% value of 40 units per contract and a maximum value of 70 units per contract.

With the price sensitivity distribution and the units per contract distribution, a contract purchases collection can be determined to include a number of contracts each having a number of units of the good and an associated price per unit. Before determining the contract purchases collection, the forecasted market can be selected, such as according to the Monte Carlo method, so that the total number of units in all of the contracts included within the contract purchases collection can be based upon the forecasted market. Presuming a total capture of the forecasted market by the manufacturer (i.e., selling all of the units in the entire market), the total number of units in all of the contracts can then be set equal to the number of units in the forecasted market. But presuming less than a total capture of the forecasted market, the total number of units in all of the contracts can be set equal to a percentage of the number of units in the forecasted market. Whereas the method of the present invention described below refers to the forecasted market, it should be understood that in instances where less than a total capture of the forecasted market is presumed, the presumed capture of the forecasted market will preferably be utilized in place of the number of units in the forecasted market.

To accurately determine the distribution of contract purchases (i.e., the contract purchases collection), a relationship between the price sensitivity distribution and the units per contract distribution is typically first established (see FIG. 8, block 30), such as via a correlation coefficient, as is known to those skilled in the art. The correlation coefficient can be selected in any one of a number of manners, however, the correlation coefficient is typically a non-positive number such that as the price per unit in a given contract increases, the number of units in the contract decreases, and vice versa. In one embodiment, for example, the correlation coefficient is determined in accordance with conventional techniques based upon a number of historical contractual sales of the good or a similar good, where each sale includes a number of units of the good at a price per unit. In this regard, when the price per unit of the good is too high, few units of the good are sold per contract. And when the price per unit is low, more units are sold. It will be appreciated though that correlation does not imply causation between price and units sold. Because unit price and units per contract are correlated does not necessarily mean that a change in unit price causes a change in units per contract and vice versa. Therefore, the possibility remains that a high price can be associated with contracts including a large number of units, or a low price can be associated with contracts including a small number of units.

Once the price sensitivity distribution is related to the units per contract distribution, the contract purchases collection can be determined by first determining the number of units in each contract, as shown in block 32. Like the forecasted market, a predefined number of contracts and the number of units in each contract are preferably determined according to the Monte Carlo method based upon the units per contract distribution. Because the forecasted market has been defined to include a predefined number of units of the good in the market, the aggregate number of units in each contract within the forecasted market totals the predefined number of units in the forecasted market or, alternatively, a percentage of the predefined number of units if less than total market capture of the forecasted market is presumed. In this regard, the Monte Carlo method can be used to repeatedly select different numbers of contracts and different numbers of units in each contract, so long as the aggregate number of units in each contract within the forecasted market does not exceed the predefined number of units in the forecasted market (or percentage of the predefined number). By repeatedly selecting different numbers of contracts and different numbers of units in each contract, many different contract purchases collections can be determined for the forecasted market.

Either as the number of units in each contract is determined, or after the number of units is determined, the associated price per unit of the units in each contract is determined based upon the number of units in the respective contract, the price sensitivity distribution and the correlation between the units per contract distribution and the price sensitivity distribution, as shown in block 34. With the number of units per contract and the associated price per unit of the units in each contract, a contract purchases collection for the forecasted market can be determined as a plurality of contracts, with each contract having an associated number of units of the good at a given price per unit, as shown in block 36. The contract purchases collection can be represented in any one of a number of manners but, in one embodiment, the contract purchases collection is represented as a scatter plot of the units in each contract at the corresponding price per unit, as shown in FIG. 10 with a forecasted market of 681 units and a presumed market capture of 60% (i.e., 409 units).

As described above, the contract purchases collection can be determined by determining a correlation between the price sensitivity distribution and the units per contract distribution, selecting a number of contracts and a number of units in each contract according to the Monte Carlo method, and thereafter determining a price per unit contract. It will be understood, however, that the contract purchases collection can be determined in any of a number of different manners. For example, the contract purchases collection can be determined by determining the correlation and thereafter selecting a number of contracts, such as randomly selecting a defined number of contracts (e.g., 100 contracts). With the number of contracts, then, a price sensitivity distribution and a units per contract distribution can be defined for each contract, where the distributions can differ between one or more contracts or remain the same across all of the defined number of contracts. Where the distributions differ between one or more contracts, the correlation can similarly differ but, when the distributions remain the same across all of the contracts, the correlation is preferably the same across all of the contracts.

For each of the defined contracts, then, a number of units in the respective contract can be determined, such as from the units per contract distribution according to the Monte Carlo method. Then, an associated price per unit for each of the defined contracts can be determined based upon the number of units in the respective contract, the respective price sensitivity distribution and the correlation between the units per contract distribution and the price sensitivity distribution. Thereafter, as before, with the number of units per contract and the associated price per unit of the units in each contract, the contract purchases collection can be determined as a plurality of contracts, with each contract having an associated number of units of the good at a given price per unit.

As before, the demand for the good in the forecasted market represents the number of units consumers may purchase for at least a given price. In this regard, when modeling demand, the price per unit of each contract can be ranked in descending order from the highest price per unit down. A cumulative number of units for each different price per unit can then be calculated, as shown in block 38 of FIG. 8. The cumulative number of units for each price then would equal the cumulative number units across all of the contracts sold for a price per unit equal to or greater than the respective price. For example, the cumulative number of units associated with the highest price per unit would equal the number of units in each contact having the highest price per unit. Then, the cumulative number of units associated with the second highest price per unit would equal the number of units in each contract having the second highest price per unit plus the number of units in each contact having the highest price per unit.

Similarly, as before, the supply for the good in the forecasted market represents the number of units manufacturers may produce for no more than a given market price. In this regard, when modeling supply, the price per unit of each contract can be ranked in ascending order from the lowest price per unit up. A cumulative number of units for each different price per unit can then be calculated as the cumulative number units across all of the contracts sold for a price per unit less than or equal to the respective price. For example, the cumulative number of units associated with the lowest price per unit would equal the number of units in each contact having the lowest price per unit. Then, the cumulative number of units associated with the second lowest price per unit would equal the number of units in each contract having the second lowest price per unit plus the number of units in each contact having the lowest price per unit.

As will be appreciated, when modeling demand, the price per unit of each contract can equally be ranked in ascending order from the lowest price per unit up. In such an instance, the cumulative number of units for each price would equal the total number of units in the forecasted market minus the number of units in each contract with a price per unit lower than the respective price. For example, the cumulative number of units associated with the lowest price per unit would equal the number of units in the forecasted market or, alternatively, the percentage of the forecasted market. The cumulative number of units associated with the second lowest price per unit would then equal the number of units in the forecasted market minus the number of units in each contract with the lowest price per unit.

Just as the price per unit can be ranked in ascending order when modeling demand, the price per unit of each contract can equally be ranked in descending order from the highest price per unit up when modeling supply. In such an instance, the cumulative number of units for each price would equal the total number of units in the forecasted market minus the number of units in each contract with a price per unit higher than the respective price. For example, the cumulative number of units associated with the highest price per unit would equal the number of units in the forecasted market or, alternatively, the percentage of the forecasted market. The cumulative number of units associated with the second highest price per unit would then equal the number of units in the forecasted market minus the number of units in each contract with the highest price per unit.

With each different price per unit and the associated cumulative number of units, the demand for the good in the forecasted market, or percentage of the forecasted market, can be modeled based upon the price per unit of each of the contracts and the cumulative number of units sold for a price per unit equal to or greater than the respective price per unit, as shown in block 40 of FIG. 8. In this regard, as with the demand model for a good in a non-differentiated market, the demand model for a good in a differentiated market represents the number of units consumers may purchase for at least a given price. As such, the demand model can be thought of as a plurality of different numbers of units sold in the forecasted market, each number of units having a corresponding minimum price at which consumers will purchase the respective number of units. Similarly, the supply model for a good in a differentiated market represents the number of units manufacturers may produce when the market price is no more than a given price. As such, the supply model can be thought of as a plurality of different numbers of units produced in the forecasted market, each number of units having a corresponding maximum market price for the good.

The demand model can be represented in any one of a number of manners but, like in the case of the model for the non-differentiated market, in one embodiment the demand model is represented as a demand curve by plotting the different prices per unit versus the cumulative number of units sold for a price per unit equal to or greater than the respective price per unit, as shown in FIG. 11 with a forecasted market of 681 units and a presumed market capture of 409 units. Like the demand model, the supply model can be represented in any one of a number of manners but, in one embodiment, the supply model is represented as a supply curve by plotting the different prices per unit versus the cumulative number of units produced when the good has a market price per unit less than or equal to the respective price per unit. As illustrated in FIG. 11, for example, the demand and supply models typically do not appear as smooth as the demand and supply models in the case of the non-differentiated market. The coarseness of the demand and supply models for the differentiated market is due to the fact that the model uses distinct contractual sales, as opposed to considering the entire non-differentiated market as one contractual sale.

It will be appreciated that as the total number of units in the forecasted market changes according to the Monte Carlo method for the demand model for either the case of the non-differentiated market or the differentiated market, the demand model changes to fit the total number of units of the good. It will also be appreciated that for different numbers of units in the forecasted market, selected according to the Monte Carlo method, different market penetration distributions and different contract purchases collections will be determined for the good in the differentiated and non-differentiated market, respectively. And with the different market penetration distributions and different contract purchases collections, different demand models will be determined for each forecasted market. Thus, the respective demand models can account for uncertainty in the size of the market as affecting the demand for the good. In this regard, by repeatedly selecting different forecasted markets and repeating the method, the demand for the good in each forecasted market can be modeled.

As described below, modeling the demand for the good can be utilized with a cost model to model the profitability of the good in the forecasted market which, in turn, can be used to determine conclusions regarding the forecasted market, such as the optimum price per unit and the number of units sold. And by repeating the method for different forecasted markets, the profitability can be modeled for each forecasted market, and the conclusions can be determined for each forecasted market. The conclusions for the forecasted markets can then be used, such as by the manufacturer, to facilitate an understanding of how uncertainty in the price of the good, the number of units and/or contracts, as well as the price per unit of the good in the contracts, affects demand for the good. With such an understanding, then, the manufacturer can be in a better position to select a price at which to sell each unit of the good and a number of units of the good to produce.

II. Modeling the Profitability of a Good

By utilizing the demand for the good, modeled according to the present invention, the profitability of the good can be modeled thereby facilitating an understanding of how uncertainty in demand for the good, as well as uncertainty in cost of producing the good, can affect profitability. In this regard, just as the demand model differs depending on whether the goods are in a non-differentiated market or a differentiated market, the profitability of the good also differs depending on the type of market. As such, the present invention provides systems, methods and computer program products for modeling the profitability of a good for goods in both non-differentiated markets as well as differentiated markets.

A. Goods in Non-Differentiated Markets

Modeling the profitability of a good in a non-differentiated market generally begins by modeling the demand for the good, such as according to embodiments of the present invention as described above with reference to FIGS. 1-6. Along with modeling the demand for the good, the cost of producing the good is also modeled. In this regard, the cost model is typically based on the average cost per unit to produce the good and the number of units produced, or sold. In this regard, the cost model accounts for uncertainty in the size of the market, just as does the demand model. Further, whereas the cost of producing the good can be modeled in any one of a number of manners, the cost preferably considers the effect of the number of units produced, or sold, on the cost to produce each unit of the good. In this regard, costs associated with producing a good in many markets tend to decline as the manufacturer gains experience with that production.

Whereas one might expect the cost of producing each unit of the good to remain constant, the cost to produce each unit of the good is typically more than the expected cost of producing each unit for the first units produced. And as the number of units produced increases, the manufacturer typically gains experience that drives the cost to produce each unit down to the expected cost and below, and thereafter eventually leveling to an optimum cost of producing each unit. The change in the cost to produce each unit can generally be considered to be attributable to a "learning curve" experienced by the manufacturer in manufacturing the good. A cost model accounting for a learning curve can be represented in any one of a number of different manners but, in one embodiment, the cost model is represented as a reverse cumulative cost curve by plotting the different costs per unit versus the cumulative number of units produced for the respective cost per unit, as shown in FIG. 12. As an example of one method by which the cost to produce each unit of a good in a non-differentiated market can be modeled, see U.S. patent application Ser. No. 10/453,779, entitled: Systems, Methods and Computer Program Products for Determining A Learning Curve Value and Modeling Associated Profitability and Costs of A Good, filed concurrently herewith, the contents of which are hereby incorporated by reference in its entirety.

Once the demand and cost have been modeled for a forecasted market, the profitability for the good for the forecasted market can be modeled. In this regard, the profitability can be represented as the result of subtracting the cost per unit from the price per unit and multiplying the difference by the number of units sold for the corresponding fraction of the forecasted market. Graphically, as shown in FIG. 13, by simultaneously plotting the demand curve and the cost curve for the forecasted market, the profitability can be seen as directly related to the distance between the two curves. Like the demand model and the cost model, the profitability model can be represented in any one of a number of different manners. In one embodiment, shown in FIG. 14, the profitability model can be represented as a profitability curve by plotting the number of units that must be sold to achieve at least a given profit.

From the profitability model, as well as the demand and cost models, conclusions regarding the forecasted market can be drawn from collectively modeling the demand, cost and profitability for the forecasted market. For example, the maximum profit for the good in the forecasted market can be seen as the point where the price exceeds the cost by the greatest amount. By determining the maximum profit, the optimum price for each unit of the good and the optimum number of units sold in the forecasted market (i.e., fraction of the number of goods in the market), as well as the corresponding cost associated with the optimum price and number of units sold, in the forecasted market can be determined. It will be appreciated that by plotting the optimum prices for different forecasted markets and different demand models (shown in FIG. 7), the resulting plot of optimum prices over the range of demand models will typically exhibit a distribution similar to the market potential distribution, as shown in FIG. 3. By plotting different demand models, uncertainty in the size of the market can be illustrated as the demand model changes depending upon the number of units selected in the forecasted market.

Additionally, or alternatively, other conclusions respective of the maximum profit, the optimum price, number of units and cost can be determined. For example, the maximum profit margin for the forecasted market can be determined by dividing the difference between the optimum price and associated cost by the optimum price, and thereafter recorded. Further, the price per unit and number of units at which the forecasted market clears can be determined from the point where the profitability is zero (or the point where the demand model intersects the cost model).

At this point it should be made clear that the demand and the cost models, as well as the profitability model, up to this point have all been tied to one forecasted market of a predefined number of goods selected according to a method for randomly selecting a predefined number of units of the good, such as the Monte Carlo method. As such, after determining the conclusions regarding the forecasted market, such as the optimum number of goods and corresponding price for each unit, as well as the maximum profit, the conclusions can be recorded, and thereafter the method can then be repeated a plurality of times for different forecasted markets selected according to the Monte Carlo method, with the conclusions recorded for each forecasted market.

The conclusions for all of the forecasted markets can also be organized into respective distributions. The distributions can then be defined, such as by a curve type and a mean and associated standard deviation. Various of the conclusions and other variables can then be plotted against one another, such as by plotting the price sensitivity distribution against distributions for the optimum price and recurring cost, as shown in FIG. 15. It will be noted that the right tail of the recurring cost distribution is truncated from the plot. In such instances, recurring costs exceeded price so the manufacturer realizes no gross profits, and as such, the manufacturer in such instances is likely to terminate sale of the good by the principals of real options. Only data on successful business case 'instances' are tabulated, resulting in statistical information (mean, most likely, standard deviation, etc.) that is indicative of target prices or costs required to be successful in the market modeled.

Also from the distributions, a business case for the good can be created. For example, the business case can receive the distribution for the maximum profit (e.g., gross profit), as such may be determined based upon the optimum price for each unit and the corresponding optimum number of goods. Based upon the distribution, then, the market value of the project can be determined and plotted over time, as shown in FIG. 16. As shown, the business case can plot the nonrecurring costs associated with the project (shown below zero for years three through five). Additionally, the business case can plot the profit associated with the project, as determined by the difference between gross profits and recurring costs (shown above zero for years six through fourteen). The market value, as well as the nonrecurring costs, can be plotted over time according to any of a number of different techniques. According to one advantageous technique, however, the market value and nonrecurring costs are plotted over time based upon a measure of uncertainty in the risk and return associated with the good, as well as how the uncertainty can vary over time. For more information on such a technique, see U.S. patent application Ser. No. 10/453,396, entitled: Systems, Methods and Computer Program Products for Modeling Uncertain Future Benefits, filed concurrently herewith, the contents of which are hereby incorporated by reference in its entirety.

B. Goods in Differentiated Markets

In differentiated markets, modeling the profitability also generally begins by modeling the demand for a number of contracts for the good including the number of units and associated price per unit. In this regard, the demand for the good can advantageously be modeled according to the present invention as described above with reference to FIGS. 2, 3 and 8-11. In addition to modeling the demand, the cost of producing the good can be modeled based on the average cost per unit to produce the good and the number of units produced, or sold. The cost of producing the good can be modeled in any one of a number of manners, such as according to the method described above. Because the demand for the good in the forecasted market represents the number of units consumers may purchase for at least a given price, the learning curve used to model the cost is a function of the cumulative number of units associated with each price per unit, as described above in conjunction with modeling the demand for goods in a differentiated market. As shown in FIG. 17, just as the demand for the differentiated market appears coarse as a plurality of connected contractual sales, the cost curve likewise appears as a plurality of connected costs for producing respective cumulative numbers of units for each price per unit.

In the differentiated market, the profitability can be represented in a manner similar to the non-differentiated market. That is, the profitability can be represented for each contract as the difference of the respective price per unit and the respective cost per unit multiplied by the number of units sold for the respective contract. As will be apparent, since the demand model for the good in the context of a differentiated market describes individual contractual sales, and the cost model describes average cost and is based on a number of units sold, a number of units sold must be selected in order to model the profitability of the good for the forecasted market. If the number of contracts or the number of units in one or more contracts changes, or if the number of units in the presumed percentage capture of the market changes, the average cost of producing the units for each contract would likewise change, thus changing the model of the profitability.

To model the profitability for all possibilities of the number of units in each contract would take an unnecessarily long period of time. But modeling the profitability for all possibilities is not necessary. In this regard, in a differentiated market it has been found that selling and, thus producing, as many units as possible always attains the most profit. Therefore, in modeling the profitability, the cost model can be replaced with the lowest cost value for the respective forecasted market (shown by the dashed line on FIG. 17), or for percent capture of the forecasted market. The cost model can be so replaced since the lowest cost value always corresponds to capturing the market share of the forecasted market and, thus, selling all of the units of the good the manufacturer produces. Profitability, then, can be measured by the profitability of the forecasted market (presuming total market capture) based upon the profitability of each contractual sale within the forecasted market.

Thus, from the demand model, the profitability of each contractual sale can be determined by subtracting the lowest average cost to produce the number of units in the contract from the price per unit of the units in the contract, and multiplying the difference by the number of units in the contract. The profitability of the forecasted market can then be modeled by determining a cumulative profitability at each contractual sale. In this regard, the profitability of the forecasted market for each price per unit can be determined by adding the profit for the contractual sale having the respective price per unit with the profit for the other contractual sales with units making up the cumulative number of units associated with the price per unit, as defined in conjunction with modeling the demand, i.e., the profit from contractual sales having the same or greater prices per unit than the respective price per unit.

For example, the profitability of the forecasted market at the highest price per unit equals only profit from the contractual sales having the highest price per unit. The profitability at the highest price per unit equals such because the cumulative number of units associated with the highest price per unit only includes the number of units in the contracts having the highest price per unit. The profitability at the second highest price per unit, on the other hand, equals the profit from the contractual sales having the second highest price per unit plus the profit from the contractual sales having the highest price per unit. In this regard, the cumulative units associated with the second highest price per unit equals the number of units in each contract having the second highest price per unit plus the number of units in each contact having the highest price per unit.

It should be pointed out that the profitability model for the forecasted market can be misleading because the profitability model can appear as though increasing the number of units in the forecasted market would better maximize profits. The misconception is caused by the fact that, by increasing the predefined number of units in the forecasted market or presumed capture of the forecasted market, the lowest average cost to produce the units decreases. It should be noted, however, that one manufacturer of the good can only capture a defined share of the market. In this regard, increasing the number of units produced does not necessarily increase the share of the market captured by the respective manufacturer. Thus, producing more units of the good does not necessarily mean that the manufacturer of the good will be able to sell the additional units above the market share of the respective manufacturer.

Just as in the case with goods in non-differentiated markets, in differentiated markets conclusions regarding the forecasted market can be drawn from collectively modeling the demand, cost (or lowest cost value) and profitability for the forecasted market. For example, because the maximum profit corresponds to selling as many units as possible, the maximum profit for the good in the forecasted market (or in the percent capture of the forecasted market) can be seen as the point where all of the units of the good in either the market, or percent capture of the market, have been sold. Also, for example, a price to achieve maximum profits can be determined, such as by determining a weighted average price per unit from all of the contractual sales in the forecasted market (or captured percentage). Other conclusions might include the number of units in the forecasted market, the number of units sold in the presumed capture of the forecasted market (if less than total capture), the number of units not sold by the manufacturer in the forecasted market (again presuming less than total capture), and the maximum profit margin for the forecasted market (or captured percentage).

Also just as in the case of non-differentiated markets, the demand and the cost, as well as the profitability of the good for differentiated markets, up to this point have all been tied to a forecasted market of a predefined number of goods selected according to the Monte Carlo method. After determining the conclusions regarding the forecasted market, such as the maximum profit, the weighted average price, number of units and cost, the conclusions can be recorded. Once the conclusions have been recorded, the method can then be repeated a plurality of times for different forecasted markets selected according to the Monte Carlo method, with the conclusions recorded for each forecasted market. The conclusions for all of the forecasted markets can then be organized into respective distributions. The distributions can then be defined, such as by a curve type and a mean and associated standard deviation. And from the distributions, a business case for the good can be created, such as in a manner similar to that shown in FIG. 16 and described in U.S. patent application Ser. No. 10/453,396, entitled: Systems, Methods and Computer Program Products for Modeling Uncertain Future Benefits.

As shown in FIG. 14, for certain quantities of units sold, the profitability model actually demonstrates a negative profitability, or a loss for sales of the good. Thus, it is oftentimes desirable to determine whether the profitability of the good is positive before exercising a contingent claim, such as whether to initiate or continue the project. Alternatively, it is desirable to determine whether the profitability of the good is above a predetermined threshold before exercising the contingent claim. Contingent claims oftentimes come in the form of a call in which the manufacturer has an option to invest an amount of money, or additional amounts of money, in order to start producing or continue producing the good. As such, if the initial stages of the production and sale of the good have proved unsuccessful and/or if the future prospects for the profitability of the good appear bleak, the manufacturer will likely decline to invest the money, or additional money, and thereby forego exercise of the call and will therefore decline to produce the good or terminate production of the good. Alternatively, if the initial stages of the production and sale of the good have been successful and/or if the prospects of the profitability of the good are bright, the manufacturer will likely make the necessary investment in order to begin or continue production of the good.

Regardless of the type of contingent claim, it is desirable to determine the value of a good and, in particular, the contingent claim at the present time. By determining the value of the contingent claim, the manufacturer can avoid overpaying for production of the good as a result of an overvaluation of the contingent claim. Conversely, the manufacturer can identify goods in which the value of the contingent claim has been undervalued and can give strong consideration to investing in the production of these goods since they likely represent worthwhile investment opportunities. As such, by modeling the demand and cost of a good and, thus, the profitability of a good, the systems, methods and computer program products of the present invention can facilitate determining the value of the good and, in particular, the contingent claim at the present time. For more information on determining the value of the project, see U.S. patent application Ser. No. 09/902,021 entitled: Systems, Methods and Computer Program Products for Performing a Generalized Contingent Claim Valuation, the contents of which are hereby incorporated by reference in its entirety.

The systems, methods and computer program products of the present invention therefore are capable of modeling the demand, supply and associated profitability based on sparse historical data or estimates regarding price and quantity of the good. By selecting a forecasted market according to the Monte Carlo method based upon the market potential distribution, the present invention is capable of modeling the demand, supply and, thus the profitability as a function of the size of the market within which the good is sold more adequately than conventional methods of modeling the demand. Further, by including a lognormal price sensitivity distribution, the present invention is capable of modeling the demand, supply and associated profitability while better accounting for how changing the price of the good changes the number of units of the good purchased.

By accounting for variability, or uncertainty, in the price of the good and the number of units of the good purchased, embodiments of the present invention are capable of modeling demand, supply and associated profitability to thereby facilitate an understanding of how uncertainty in a market affects demand, supply and profitability. In this regard, such an understanding can be advantageous to those associated with the manufacture, sale and purchase of the good, such as in the context of commercial transactions. In this regard, programs for the future sale of goods inherently have associated uncertainty, particularly as it relates to the market for the goods, typically defined by the number of good purchased and the price at which each unit of the good is purchased. According to embodiments of the present invention, for example, demand, supply and associated profitability of a good can be modeled in a manner such that a manufacturer can be in a better position to not only decide whether to bring a good to market, but to also select a price at which to sell each unit of the good, as well as a number of units of the good to produce.

As shown in FIG. 18, the system of the present invention is typically embodied by a processing element and an associated memory device, both of which are commonly comprised by a computer 40 or the like. In this regard, as indicated above, the method of embodiments of the present invention can be performed by the processing element manipulating data stored by the memory device with any one of a number of commercially available computer software programs. In one embodiment, the method can be performed with data that is capable of being manipulated and/or presented in spreadsheet form. For example, the method can be performed by the processing element manipulating data stored by the memory device with Excel, a spreadsheet software program distributed by the Microsoft Corporation of Redmond, Wash., including Crystal Ball, a Monte Carlo simulation software program distributed by Decisioneering, Inc. of Denver, Colo. The computer can include a display 42 for presenting information relative to performing embodiments of the method of the present invention, including the various distributions, models and/or conclusions as determined according to embodiments of the present invention. To plot information relative to performing embodiments of the method of the present invention, the computer can further include a printer 44. Also, the computer 40 can include a means for locally or remotely transferring the information relative to performing embodiments of the method of the present invention. For example, the computer can include a facsimile machine 46 for transmitting information to other facsimile machines, computers or the like. Additionally, or alternatively, the computer can include a modem 48 to transfer information to other computers or the like. Further, the computer can include an interface (not shown) to a network, such as a local area network (LAN), and/or a wide area network (WAN). For example, the computer can include an Ethernet Personal Computer Memory Card International Association (PCM-CIA) card configured to transmit and receive information to and from a LAN, WAN or the like.

In one advantageous technique applicable to embodiments of the present invention, the methods according to embodiments of the present invention may be embodied in a software or data module, component, portfolio or the like, that can be manipulated or otherwise operated within a spreadsheet software program such as Excel. Such a technique may be advantageous in a number of different contexts, such as in the context of financial modeling and analysis. In this regard, modules, components and/or a portfolio that perform various financial modeling functions can be combined to gain a more complete understanding of a financial context. A brief description of such a technique as such may be applied to the present invention will now be described below.

According to such a technique, data capable of being manipulated to perform at least a portion of the methods of the present invention can be embodied in a module, which can thereafter be linked or otherwise associated with other portions of the methods of the present invention embodied in other modules so as to formulate a component. Then, if so desired, the component can be linked or otherwise associated with other components capable of performing other related methods to thereby form a portfolio. For example, methods of modeling demand according to embodiments of the present invention can be embodied in one module while methods of modeling cost according to embodiments of the present invention can be embodied in another module. The two modules can then be linked or otherwise associated with one another to formulate a component capable of modeling profitability based upon the demand and cost models. Then, if so desired, the component for modeling profitability can be linked or otherwise associated with another component to perform another function. For example, the component for modeling profitability can be linked or otherwise associated with a component capable of forecasting revenue over time to thereby create a business case for the good. In this regard, such a component capable of forecasting revenue over time may operate according to U.S. patent application Ser. No. 10/453,396, entitled: Systems, Methods and Computer Program Products for Modeling Uncertain Future Benefits.

According to one aspect of the present invention, the system of the present invention generally operates under control of a computer program product. The computer program product for performing the methods of embodiments of the present invention includes a computer-readable storage medium, such as the non-volatile storage medium, and computer-readable program code portions, such as a series of computer instructions, embodied in the computer-readable storage medium.

In this regard, FIGS. 1 and 7 are flowcharts of methods, systems and program products according to the invention. It will be understood that each block or step of the flowchart, and combinations of blocks in the flowchart, can be implemented by computer program instructions. These computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block (s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method performed by execution of computer-readable program code by at least one processor of at least one computer system, the method comprising:
   determining, using at least one of the processors, a price sensitivity probability distribution of a price per unit of a good, the price sensitivity probability distribution assigning a respective probability to each of a plurality of different predetermined prices per unit of the good, the price sensitivity probability distribution reflecting an uncertainty in the price per unit of the good;
   determining, using at least one of the processors, a market potential probability distribution of a number of units of the good in a market associated with the good, the market potential probability distribution assigning a respective probability to each of a plurality of different numbers of units of the good, the market potential probability distribution reflecting an uncertainty in the number of units of the good in the market;
   generating, using at least one of the processors and from the price sensitivity and market potential probability distributions, a model of at least one of demand or supply for the good; and
   determining a monetary or market measure of the good from the model of at least one of demand or supply.

2. A method according to claim 1, wherein determining a price sensitivity probability distribution comprises:
   determining a price sensitivity probability distribution of a price per unit of the good; and
   recasting the price sensitivity probability distribution, wherein recasting the price sensitivity probability distribution comprises recasting the price sensitivity probability distribution in a reverse cumulative format when generating a model of demand, and wherein recasting the price sensitivity probability distribution comprises recasting the price sensitivity probability distribution in a cumulative format when generating a model of supply.

3. A method according to claim 1, wherein determining a price sensitivity probability distribution comprises determining a lognormal price sensitivity probability distribution.

4. A method according to claim 3, wherein determining a lognormal price sensitivity probability distribution comprises determining a lognormal price sensitivity probability distribution from a mean purchase price and an associated standard deviation.

5. A method according to claim 2, wherein determining a market potential probability distribution comprises determining a lognormal market potential probability distribution.

6. A method according to claim 1 further comprising forecasting a market including randomly selecting a predefined number of units of the good from the market potential probability distribution, wherein forecasting the market occurs before generating a model of at least one of demand or supply, and wherein generating a model of at least one of demand or supply comprises generating a model of at least one of demand or supply from the price sensitivity probability distribution and the forecasted market.

7. A method according to claim 6, wherein generating a model of at least one of demand or supply comprises determining a relationship between a plurality of prices per unit and different numbers of units of the good that represent corresponding percentages of the predefined number of units in the forecasted market.

8. A method according to claim 6, wherein forecasting the market comprises forecasting the market and thereafter determining a market penetration probability distribution from different numbers of units of the good that represent corresponding percentages of the predefined number of units in the forecasted market, and wherein generating a model of at least one of demand or supply comprises generating a model of at least one of demand or supply from the price sensitivity probability distribution and the market penetration probability distribution.

9. A method according to claim 6, wherein forecasting a market comprises forecasting a market according to a Monte Carlo method.

10. A method according to claim 6, wherein forecasting a market comprises repeatedly forecasting different markets, a plurality of which includes a different predefined number of units of the good, and wherein generating a model of at least one of demand or supply comprises generating a model of at least one of demand or supply for each of the forecasted markets.

11. A method of claim 1, wherein generating a model of at least one of demand or supply comprises generating a model of at least demand, and wherein the method further comprises:
   generating a model of cost of the good; and
   generating a model of profitability of the good from the demand model and the cost model.

12. A method according to claim 11, wherein generating a model of the cost comprises generating a model of an average cost per unit for the different numbers of units, and wherein generating a model of the profitability comprises subtracting the average cost per unit for the different numbers of units from the prices per unit for the respective different numbers of units.

13. A method according to claim 11 further comprising forecasting a market including randomly selecting a predefined number of units of the good from the market potential probability distribution, wherein forecasting the market occurs before generating a model of the demand and generating a model of the cost, wherein generating a model of the demand comprises generating a model of the demand from the price sensitivity probability distribution and the forecasted market, and wherein generating a model of the cost comprises generating a model of the cost from the forecasted market.

14. A method according to claim 13, wherein forecasting the market comprises repeatedly forecasting different markets, wherein each forecasted market includes a predefined number of units of the good, wherein generating a model of the demand comprises generating a model of the demand for each of the forecasted markets, wherein generating a model of the cost comprises generating a model of the cost for each of the forecasted markets, and wherein generating a model of the profitability comprises generating a model of the profitability for each of the forecasted markets.

15. A method according to claim 1 further comprising:
determining at least one contract purchases collection for at least one predefined number of contracts from a units per contract probability distribution and a correlation between the price sensitivity probability distribution and the units per contract probability distribution, wherein generating a model of at least one of demand or supply comprises generating a model of at least one of demand or supply from the at least one contract purchases collection and the market potential probability distribution.

16. A method according to claim 15, wherein determining each contract purchases collection comprises:
determining a number of units included in each of a predefined number of contracts from the units per contract probability distribution; and
determining a price per unit for the units included in each of the predefined number of contracts.

17. A method according to claim 16, wherein generating a model of at least one of demand or supply comprises:
calculating at least one cumulative number of units for each different price per unit, wherein calculating the cumulative number of units comprises summing the number of units in each contract having a price per unit no less than the respective price per unit when generating a model of demand, and wherein calculating the cumulative number of units comprises summing the number of units in each contract having a price per unit no greater than the respective price per unit when generating a model of supply; and
generating a model of at least one of demand or supply from each different price per unit and the respective cumulative number of units for the at least one contract purchases collection.

18. A method according to claim 16, wherein generating a model of at least one of demand or supply comprises:
calculating at least one cumulative number of units for each different price per unit, wherein calculating the cumulative number of units comprises determining the difference between the predefined number of units in the forecasted market and a sum of the number of units in each contract having a price per unit no greater than the respective price per unit when generating a model of demand, and wherein calculating the cumulative number of units comprises determining the difference between the predefined number of units in the forecasted market and a sum of the number of units in each contract having a price per unit no less than the respective price per unit when generating a model of supply; and
generating a model of at least one of demand or supply from each different price per unit and the respective cumulative number of units for the at least one contract purchases collection.

19. A method according to claim 16, wherein determining the number of units included in each contract comprises determining the number of units in each contract such that a sum of the number of units included in each contract equals a percentage of the predetermined number of units in the forecasted market.

20. A method according to claim 15, wherein each contract purchases collection includes a predefined number of contracts each having a number of units and a price per unit, said method further comprising determining the number of units included in each contract according to a Monte Carlo method.

21. A method according to claim 15 further comprising forecasting a market including randomly selecting a predefined number of units of the good from a market potential probability distribution, wherein forecasting a market occurs before generating a model of at least one of demand or supply, and wherein generating a model of at least one of demand or supply comprises generating a model of at least one of demand or supply for the good from the at least one contract purchases collection and the forecasted market.

22. A method according to claim 21, wherein forecasting a market comprises repeatedly forecasting different markets, a plurality of which includes a different predefined number of units of the good, wherein determining at least one contract purchases collection comprises determining at least one contract purchases collection for each of the forecasted markets, and wherein generating a model of at least one of demand or supply comprises generating a model of at least one of demand or supply for the good for each of the forecasted markets.

23. A method according to claim 15, wherein generating a model of at least one of demand or supply comprises generating a model of at least demand, and wherein the method further comprises:
generating a model of cost of the good; and
generating a model of the profitability of the good from the demand model and the cost model.

24. A method according to claim 23 further comprising forecasting a market including randomly selecting a predefined number of units of the good from the market potential probability distribution, wherein forecasting the market occurs before generating a model of the demand and generating a model of the cost, wherein generating a model of the demand comprises generating a model of the demand from the at least one contract purchases collection and the forecasted market, and wherein generating a model of the cost comprises generating a model of the cost from the forecasted market.

25. A method according to claim 24, wherein forecasting a market comprises repeatedly forecasting different markets, a plurality of which includes a different predefined number of units of the good, wherein generating a model of demand comprises generating a model of the demand for each of the forecasted markets, wherein generating a model of cost comprises generating a model of the cost for each of the forecasted markets, and wherein generating a model of the profitability comprises generating a model of the profitability for each of the forecasted markets.

26. A method according to claim 23, wherein determining each contract purchases collection includes determining a price per unit for a number of units included in each of a predefined number of contracts such that each different price per unit has an associated cumulative number of units comprising the sum of the number of units in each contract having a price per unit no less than the respective price per unit, wherein generating a model of the cost of the good comprises generating a model of an average cost per unit for each cumulative number of units associated with the different prices per unit and thereafter selecting the lowest cost per unit, and wherein generating a model of the profitability comprises subtracting the lowest cost per unit from the price per unit associated with the each cumulative number of units.

27. A method according to claim 1, wherein generating a model of at least one of demand or supply comprises generating a model of at least one of demand or supply with a processor operating a spreadsheet software, and wherein the method further comprises presenting a display of at least one of the demand model or supply model on a display coupled to the processor.

28. A method according to claim 27, wherein presenting the display of the demand model comprises presenting the demand model as a plot of different numbers of units of the good and associated reverse cumulative prices, and wherein presenting the display of the supply model comprises presenting the supply model as a plot of different numbers of units of the good and associated cumulative prices.

29. An apparatus comprising:
   a processor configured to determine a price sensitivity probability distribution of a price per unit of a good, the price sensitivity probability distribution assigning a respective probability to each of a plurality of different predetermined prices per unit of the good, the price sensitivity probability distribution reflecting an uncertainty in the price per unit of the good,
   wherein the processor is configured to determine a market potential probability distribution of a number of units of the good in a market associated with the good, the market potential probability distribution assigning a respective probability to each of a plurality of different numbers of units of the good, the market potential probability distribution reflecting an uncertainty in the number of units of the good in the market,
   wherein the processor is configured to generate, from the price sensitivity and market potential probability distributions, a model of at least one of demand or supply for the good, and
   wherein the processor is configured to determine a monetary or market measure of the good from the model of at least one of demand or supply.

30. An apparatus according to claim 29, wherein the processor being configured to determine a price sensitivity probability distribution includes being configured to:
   determine the price sensitivity probability distribution of a price per unit of the good; and
   recast the price sensitivity probability distribution, wherein the processor is configured to recast the price sensitivity probability distribution in a reverse cumulative format when generating a model of demand, and wherein the processor is configured to recast the price sensitivity probability distribution in a cumulative format when generating a model of supply.

31. An apparatus according to claim 30, wherein the processor being configured to determine the price sensitivity probability distribution includes being configured to determine a lognormal price sensitivity probability distribution.

32. An apparatus according to claim 31, wherein the processor being configured to determine the lognormal price sensitivity probability distribution includes being configured to determine the lognormal price sensitivity probability distribution from a mean purchase price and an associated standard deviation.

33. An apparatus according to claim 30, wherein the processor being configured to determine a market potential probability distribution includes being configured to determine a lognormal market potential probability distribution.

34. An apparatus according to claim 29, wherein the processor is further configured to forecast a market, including being configured to randomly select a predefined number of units of the good from the market potential probability distribution, and wherein the processor is configured to generate a model of at least one of demand or supply from the price sensitivity probability distribution and the forecasted market.

35. An apparatus according to claim 34, wherein the processor being configured to generate a model of at least one of demand or supply includes being configured to determine a relationship between a plurality of prices per unit and different numbers of units of the good that represent corresponding percentages of the predefined number of units in the forecasted market.

36. An apparatus according to claim 34, wherein the processor is configured to forecast the market and thereafter determine a market penetration probability distribution from different numbers of units of the good that represent corresponding percentages of the predefined number of units in the forecasted market, and wherein the processor is configured to generate a model of at least one of demand or supply from the price sensitivity probability distribution and the market penetration probability distribution.

37. An apparatus according to claim 34, wherein the processor is configured to forecast the market according to a Monte Carlo method.

38. An apparatus according to claim 34, wherein the processor is configured to repeatedly forecast different markets, a plurality of which includes a different predefined number of units of the good, and wherein the processor is configured to generate a model of at least one of demand or supply for each of the forecasted markets.

39. An apparatus of claim 29, wherein the processor being configured to generate a model of at least one of demand or supply includes being configured to generate a model of at least demand, and wherein the processor is also configured to generate a model of cost of the good, and wherein the processor is additionally configured to generate a model of profitability of the good from the demand model and the cost model.

40. An apparatus according to claim 39, wherein the processor being configured to generate a model of the cost includes being configured to generate a model of an average cost per unit for the different numbers of units, and wherein the processor being configured to generate a model of the profitability includes being configured to subtract the average cost per unit for the different numbers of units from the prices per unit for the respective different numbers of units.

41. An apparatus according to claim 39, wherein the processor is further configured to forecast a market, including being configured to randomly select a predefined number of units of the good from the market potential probability distribution, wherein the processor is configured to generate a model of the demand from the price sensitivity probability distribution and the forecasted market, and wherein the processor is configured to generate a model of the cost from the forecasted market.

42. An apparatus according to claim 41, wherein the processor is configured to repeatedly forecast different markets, wherein each forecasted market includes a predefined number of units of the good, wherein the processor is configured to generate a model of the demand for each of the forecasted markets, wherein the processor is configured to generate a model of the cost for each of the forecasted markets, and wherein the processor is configured to generate a model of the profitability for each of the forecasted markets.

43. An apparatus according to claim 29, wherein the processor is also configured to determine at least one contract purchases collection for at least one predefined number of contracts from a units per contract probability distribution and a correlation between the price sensitivity probability distribution and the units per contract probability distribution, and wherein the processor is configured to generate a model of at least one of demand or supply from the at least one contract purchases collection and the market potential probability distribution.

44. An apparatus according to claim 43, wherein the processor being configured to determine each contract purchases collection includes being configured to:
    determine a number of units included in each of a predefined number of contracts from the units per contract probability distribution; and
    determine a price per unit for the units included in each of the predefined number of contracts.

45. An apparatus according to claim 44, wherein the processor being configured to generate a model of at least one of demand or supply includes being configured to:
    calculate at least one cumulative number of units for each different price per unit, including being configured to sum the number of units in each contract having a price per unit no less than the respective price per unit when generating a model of demand, and being configured to sum the number of units in each contract having a price per unit no greater than the respective price per unit when generating a model of supply; and
    generate a model of at least one of demand or supply from each different price per unit and the respective cumulative number of units for the at least one contract purchases collection.

46. An apparatus according to claim 44, wherein the processor being configured to generate a model of at least one of demand or supply includes being configured to:
    calculate at least one cumulative number of units for each different price per unit, including being configured to subtract the predefined number of units in the forecasted market from a sum of the number of units in each contract having a price per unit no greater than the respective price per unit when generating a model of demand, and being configured to subtract the predefined number of units in the forecasted market from a sum of the number of units in each contract having a price per unit no less than the respective price per unit when generating a model of supply; and
    generate a model of at least one of demand or supply from each different price per unit and the respective cumulative number of units for the at least one contract purchases collection.

47. An apparatus according to claim 44, wherein the processor is configured to determine the number of units included in each contract such that a sum of the number of units included in each contract equals a percentage of the predetermined number of units in the forecasted market.

48. An apparatus according to claim 43, wherein each contract purchases collection includes a predefined number of contracts each having a number of units and a price per unit, and wherein the processor is configured to determine the number of units included in each contract according to a Monte Carlo method.

49. An apparatus according to claim 43, wherein the processor is further configured to forecast a market, including being configured to randomly select a predefined number of units of the good from a market potential probability distribution, and wherein the processor is configured to generate a model of at least one of demand or supply for the good from the at least one contract purchases collection and the forecasted market.

50. An apparatus according to claim 49, wherein the processor is configured to repeatedly forecast different markets, a plurality of which includes a different predefined number of units of the good, wherein the processor is configured to determine at least one contract purchases collection for each of the forecasted markets, and wherein the processor is configured to generate a model of at least one of demand or supply for the good for each of the forecasted markets.

51. An apparatus according to claim 43, wherein the processor being configured to generate a model of at least one of demand or supply includes being configured to generate a model of at least demand, wherein the processor is also configured to generate a model of cost of the good, and wherein the processor is additionally configured to generate a model of the profitability of the good from the demand model and the cost model.

52. An apparatus according to claim 51, wherein the processor is further configured to forecast a market by randomly selecting a predefined number of units of the good from the market potential probability distribution, wherein the processor is configured to generate a model of the demand from the at least one contract purchases collection and the forecasted market, and wherein the processor is configured to generate a model of the cost from the forecasted market.

53. An apparatus according to claim 52, wherein the processor is configured to repeatedly forecast different markets, a plurality of which includes a different predefined number of units of the good, wherein the processor is configured to generate a model of the demand for each of the forecasted markets, wherein the processor is configured to generate a model of the cost for each of the forecasted markets, and wherein the processor is configured to generate a model of the profitability for each of the forecasted markets.

54. An apparatus according to claim 51, wherein the processor being configured to determine each contract purchases collection includes being configured to determine a price per unit for a number of units included in each of a predefined number of contracts such that each different price per unit has an associated cumulative number of units comprising the sum of the number of units in each contract having a price per unit no less than the respective price per unit, wherein the processor being configured to generate a model of the cost of the good includes being configured to generate a model of an average cost per unit for each cumulative number of units associated with the different prices per unit and thereafter select the lowest cost per unit, and wherein the processor being configured to generate a model of the profitability includes being configured to subtract the lowest cost per unit from the price per unit associated with the each cumulative number of units.

55. An apparatus according to claim 29, wherein the processor is configured to operate a spreadsheet software program to thereby generate the model at least one of demand or supply, the apparatus further comprising:
a display coupled to the processor, wherein the display is configured to present at least one of the demand model or the supply model.

56. An apparatus according to claim 55, wherein the display is configured to present the demand model as a plot of different numbers of units of the good and associated reverse cumulative prices, and wherein the display is configured to present the supply model as a plot of different numbers of units of the good and associated cumulative prices.

57. A computer program product comprising a computer-readable storage medium having computer-readable program code portions stored therein, the computer-readable program portions comprising:
a first executable portion configured to determine a price sensitivity probability distribution of a price per unit of a good, the price sensitivity probability distribution assigning a respective probability to each of a plurality of different predetermined prices per unit of the good, the price sensitivity probability distribution reflecting an uncertainty in the price per unit of the good;
a second executable portion configured to determine a market potential probability distribution of a number of units of the good in a market associated with the good, the market potential probability distribution assigning a respective probability to each of a plurality of different numbers of units of the good, the market potential probability distribution reflecting an uncertainty in the number of units of the good in the market;
a third executable portion configured to generate, from the price sensitivity and market potential probability distributions, a model of at least one of demand or supply for the good; and
a fourth executable portion configured to determine a monetary or market measure of the good from the model of at least one of demand or supply.

58. A computer program product according to claim 57, wherein the first executable portion being configured to determine a price sensitivity probability distribution, includes being configured to:
determine the price sensitivity probability distribution of a price per unit of the good; and
recast the price sensitivity probability distribution, wherein the fifth executable portion is configured to recast the price sensitivity probability distribution in a reverse cumulative format when the third executable portion generates a model of demand, and wherein the fifth executable portion is configured to recast the price sensitivity probability distribution in a cumulative format when the third executable portion generates a model of supply.

59. A computer program product according to claim 58, wherein the first executable portion being configured to determine the price sensitivity includes being configured to determine a lognormal price sensitivity probability distribution.

60. A computer program product according to claim 59, wherein the first executable portion is configured to determine the lognormal price sensitivity probability distribution from a mean purchase price and an associated standard deviation.

61. A computer program product according to claim 58, wherein the computer-readable program portions further comprise a fifth executable portion configured to determine the market potential probability distribution, including being configured to determine a lognormal market potential probability distribution.

62. A computer program product according to claim 57, wherein the computer-readable program portions further comprise a fifth executable portion configured to forecast a market, including being configured to randomly select a predefined number of units of the good from the market potential probability distribution, and wherein the third executable portion is configured to generate a model of at least one of demand or supply from the price sensitivity probability distribution and the forecasted market.

63. A computer program product according to claim 62, wherein the third executable portion being configured to generate a model of at least one of demand or supply includes being configured to determine a relationship between a plurality of prices per unit and different numbers of units of the good that represent corresponding percentages of the predefined number of units in the forecasted market.

64. A computer program product according to claim 62, wherein the fifth executable portion is configured to forecast the market and thereafter determine a market penetration probability distribution from different numbers of units of the good that represent corresponding percentages of the predefined number of units in the forecasted market, and wherein the third executable portion is configured to generate a model of at least one of demand or supply from the price sensitivity probability distribution and the market penetration probability distribution.

65. A computer program product according to claim 62, wherein the fifth executable portion is configured to forecast the market according to a Monte Carlo method.

66. A computer program product according to claim 62, wherein the fifth executable portion is configured to repeatedly forecast different markets, a plurality of which includes a different predefined number of units of the good, and wherein the third executable portion is configured to generate a model of at least one of demand or supply for each of the forecasted markets.

67. A computer program product of claim 57, wherein the third executable portion being configured to generate a model of at least one of demand or supply includes being configured to generate a model of at least demand, and wherein the computer-readable program portions further comprise:
a fifth executable portion configured to generate a model of cost of the good; and
a sixth executable portion configured to generate a model of profitability of the good from the demand model and the cost model.

68. A computer program product according to claim 67, wherein the fifth executable portion being configured to generate a model of the cost includes being configured to generate a model of an average cost per unit for the different numbers of units, and wherein the sixth executable portion being configured to generate a model of the profitability includes being configured to subtract the average cost per unit for the different numbers of units from the prices per unit for the respective different numbers of units.

69. A computer program product according to claim 67, wherein the computer-readable program portions further comprise a seventh executable portion configured to forecast a market, including being configured to randomly select a predefined number of units of the good from the market potential probability distribution, wherein the third executable portion is configured to generate a model of the demand from the price sensitivity probability distribution and the forecasted market, and wherein the fifth executable portion is configured to generate a model of the cost from the forecasted market.

70. A computer program product according to claim 69, wherein the seventh executable portion is configured to repeatedly forecast different markets, wherein each forecasted market includes a predefined number of units of the good, wherein the third executable portion is configured to generate a model of the demand for each of the forecasted markets, wherein the fifth executable portion is configured to generate a model of the cost for each of the forecasted markets, and wherein the sixth executable portion is configured to generate a model of the profitability for each of the forecasted markets.

71. A computer program product according to claim 57, wherein the computer-readable program portions further comprise:
   a fifth executable portion configured to determine at least one contract purchases collection for at least one predefined number of contracts from a units per contract probability distribution and a correlation between the price sensitivity probability distribution and the units per contract probability distribution, wherein the third executable portion is configured to generate a model of at least one of demand or supply from the at least one contract purchases collection and the market potential probability distribution.

72. A computer program product according to claim 71, wherein the fifth executable portion being configured to determine each contract purchases collection includes being configured to:
   determine a number of units included in each of a predefined number of contracts from the units per contract probability distribution; and
   determine a price per unit for the units included in each of the predefined number of contracts.

73. A computer program product according to claim 72, wherein the third executable portion being configured to generate a model of at least one of demand or supply includes being configured to:
   calculate at least one cumulative number of units for each different price per unit, including being configured to sum the number of units in each contract having a price per unit no less than the respective price per unit when generating a model of demand, and being configured to sum the number of units in each contract having a price per unit no greater than the respective price per unit when generating a model of supply; and
   generate a model of at least one of demand or supply from each different price per unit and the respective cumulative number of units for the at least one contract purchases collection.

74. A computer program product according to claim 72, wherein the third executable portion being configured to generate a model of at least one of demand or supply includes being configured to:
   calculate at least one cumulative number of units for each different price per unit, including being configured to determine the difference between the predefined number of units in the forecasted market and a sum of the number of units in each contract having a price per unit no greater than the respective price per unit when generating a model of demand, and determine the difference between the predefined number of units in the forecasted market and a sum of the number of units in each contract having a price per unit no less than the respective price per unit when generating a model of supply; and
   generate a model of at least one of demand or supply from each different price per unit and the respective cumulative number of units for the at least one contract purchases collection.

75. A computer program product according to claim 72, wherein the fifth executable portion is configured to determine the number of units in each contract such that a sum of the number of units included in each contract equals a percentage of the predetermined number of units in the forecasted market.

76. A computer program product according to claim 71, wherein each contract purchases collection includes a predefined number of contracts each having a number of units and a price per unit, the computer-readable program portions further comprising a sixth executable portion configured to determine the number of units included in each contract according to a Monte Carlo method.

77. A computer program product according to claim 71, wherein the computer-readable program portions further comprise a sixth executable portion configured to forecast a market, including being configured to randomly select a predefined number of units of the good from a market potential probability distribution, and wherein the third executable portion is configured to generate a model of at least one of demand or supply for the good from the at least one contract purchases collection and the forecasted market.

78. A computer program product according to claim 77, wherein the sixth executable portion is configured to repeatedly forecast different markets, a plurality of which includes a different predefined number of units of the good, wherein the fifth executable portion is configured to determine at least one contract purchases collection for each of the forecasted markets, and wherein the third executable portion is configured to generate a model of at least one of demand or supply for the good for each of the forecasted markets.

79. A computer program product according to claim 71, wherein the third executable portion being configured to generate a model of at least one of demand or supply includes being configured to generate a model of at least demand, and wherein the computer-readable program portions further comprise:
   a sixth executable portion configured to generate a model of cost of the good; and
   a seventh executable portion configured to generate a model of the profitability of the good from the demand model and the cost model.

80. A computer program product according to claim 79, wherein the computer-readable program portions further comprise an eighth executable portion configured to forecast a market, including being configured to randomly select a predefined number of units of the good from the market potential probability distribution, wherein the third executable portion is configured to generate a model of the demand from the at least one contract purchases collection and the forecasted market, and wherein the sixth executable portion is configured to generate a model of the cost from the forecasted market.

81. A computer program product according to claim 80, wherein the eighth executable portion is configured to repeatedly forecast different markets, a plurality of which includes a different predefined number of units of the good, wherein the third executable portion is configured to generate a model of the demand for each of the forecasted markets, wherein the sixth executable portion is configured to generate a model of the cost for each of the forecasted markets, and wherein the seventh executable portion is configured to generate a model of the profitability for each of the forecasted markets.

82. A computer program product according to claim 79, wherein the fifth executable portion being configured to determine each contract purchases collection includes being configured to determine a price per unit for a number of units included in each of a predefined number of contracts such that each different price per unit has an associated cumulative number of units comprising the sum of the number of units in each contract having a price per unit no less than the respective price per unit, wherein the sixth executable portion being configured to generate a model of the cost of the good includes being configured to generate a model of an average cost per unit for each cumulative number of units associated with the different prices per unit and thereafter select the lowest cost per unit, and wherein the seventh executable portion being configured to generate a model of the profitability includes being configured to subtract the lowest cost per unit from the price per unit associated with the each cumulative number of units.

83. A computer program product according to claim 57, wherein the computer-readable program portions further comprise a fifth executable portion configured to generate a display of at least one of the demand model or the supply model.

84. A computer program product according to claim 83, wherein the fifth executable portion is configured to generate a display of the demand model comprising a plot of different numbers of units of the good and associated reverse cumulative prices, and wherein the fifth executable portion is configured to generate a display of the supply model comprising a plot of different numbers of units of the good and associated cumulative prices.

\* \* \* \* \*

UNITED STATES PATENT AND TRADEMARK OFFICE
CERTIFICATE OF CORRECTION

| | | |
|---|---|---|
| PATENT NO. | : 7,627,495 B2 | Page 1 of 1 |
| APPLICATION NO. | : 10/453727 | |
| DATED | : December 1, 2009 | |
| INVENTOR(S) | : Mathews et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1734 days.

Signed and Sealed this

Twenty-first Day of December, 2010

David J. Kappos
*Director of the United States Patent and Trademark Office*